(12) United States Patent
Pinney Wood et al.

(10) Patent No.: US 10,033,754 B2
(45) Date of Patent: *Jul. 24, 2018

(54) CYBER THREAT MONITOR AND CONTROL APPARATUSES, METHODS AND SYSTEMS

(71) Applicant: Lookingglass Cyber Solutions, Inc., Baltimore, MD (US)

(72) Inventors: Christopher Paul Pinney Wood, Centreville, VA (US); John Joseph Helmsen, Rockville, MD (US); Allan Thomson, Pleasanton, CA (US); Christopher D. Coleman, Centreville, VA (US)

(73) Assignee: Lookingglass Cyber Solutions, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/663,157

(22) Filed: Jul. 28, 2017

(65) Prior Publication Data

US 2017/0331851 A1    Nov. 16, 2017

Related U.S. Application Data

(60) Continuation of application No. 14/945,102, filed on Nov. 18, 2015, now Pat. No. 9,749,347, which is a
(Continued)

(51) Int. Cl.
*H04L 29/06* (2006.01)
*G06F 17/30* (2006.01)
(Continued)

(52) U.S. Cl.
CPC .... *H04L 63/1433* (2013.01); *G06F 17/30958* (2013.01); *G06F 21/552* (2013.01);
(Continued)

(58) Field of Classification Search
CPC ..... H04L 63/1433; H04L 41/14; H04L 41/12; G06F 21/577; G06F 21/552; G06F 17/30958

See application file for complete search history.

(56) References Cited

U.S. PATENT DOCUMENTS

| 8,272,061 B1 | 9/2012 | Amnon et al. |
| 8,306,922 B1 | 11/2012 | Kunal |

(Continued)

FOREIGN PATENT DOCUMENTS

WO    WO 2013126144 A2    8/2013

OTHER PUBLICATIONS

Kevin M. Carter, et al.: "Probabilistic Threat Propagation for Network Security", IEEE Transactions on Information Forensics and Security, IEEE, Piscataway, NJ, vol. 9, No. 9, Sep. 1, 2014 [retrieved from the internet on Jul. 30, 2014].

(Continued)

*Primary Examiner* — Meng Li
(74) *Attorney, Agent, or Firm* — Cooley LLP

(57) ABSTRACT

The cyber threat monitor and control apparatuses, methods and systems (hereinafter "CTMC") determines risk across a global Internet network graph model for various virtual or physical network elements. In one embodiment, the CTMC defines a factor mechanism representing interactions among the set of network elements, the factor mechanism including a factor indicative of a correlation between a pair of network elements from the set of network elements, and dynamically calculate the probabilistic network security measure for each network element in the global Internet graph model based at least in part on the factor mechanism and any observed threat indicators related to the global Internet graph model.

20 Claims, 19 Drawing Sheets

Related U.S. Application Data division of application No. 14/562,623, filed on Dec. 5, 2014, now Pat. No. 9,210,185.

(51) Int. Cl.
  *G06F 21/55* (2013.01)
  *G06F 21/57* (2013.01)
  *H04L 12/24* (2006.01)

(52) U.S. Cl.
  CPC ............ *G06F 21/577* (2013.01); *H04L 41/12* (2013.01); *H04L 41/14* (2013.01)

(56) References Cited

U.S. PATENT DOCUMENTS

| | | |
|---|---|---|
| 8,307,444 B1 | 11/2012 | Jules et al. |
| 8,898,093 B1 | 11/2014 | Helmsen |
| 2008/0250450 A1 | 10/2008 | Lamer et al. |
| 2010/0070818 A1 | 3/2010 | Ulriksson |
| 2011/0167011 A1* | 7/2011 | Paltenghe .............. G06Q 10/06 705/320 |
| 2013/0097183 A1* | 4/2013 | McCracken ........ G06F 11/0709 707/748 |
| 2014/0280900 A1 | 9/2014 | McDowall |
| 2014/0380485 A1* | 12/2014 | Ayyagari ............ H04L 63/1433 726/25 |

OTHER PUBLICATIONS

Extended European Search Report for Application No. 15197292.4, filed Mar. 30, 2016.

* cited by examiner

CYBER THREAT MONITOR AND CONTROL APPARATUSES, METHODS AND SYSTEMS

CROSS-REFERENCE TO RELATED PATENT APPLICATIONS

This patent application is a continuation of and claims priority to and the benefit of U.S. patent application Ser. No. 14/945,102, entitled "CYBER THREAT MONITOR AND CONTROL APPARATUSES, METHODS AND SYSTEMS," and filed Nov. 18, 2015, which is a divisional of U.S. patent application Ser. No. 14/562,623 (now U.S. Pat. No. 9,210,185), entitled "CYBER THREAT MONITOR AND CONTROL APPARATUSES, METHODS AND SYSTEMS," and filed Dec. 5, 2014, both of which are herein incorporated by reference in their entirety.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

Some embodiments generally relate to apparatuses, methods, and systems for cyber security management, and more particularly, relate to cyber threat monitor and control ("CTMC") apparatuses, methods and systems.

BACKGROUND

Computer malware is a type of software that disrupts the normal operation of a computer, and incurs security risk to a computer network and any asset connected to the computer network. A malware instance can, for example, send malicious code programs to a computer so as to burden the processing capacity of the computer, gain access to secured data without authorization, or modify critical system settings. Anti-malware programs are designed to detect potential threats of malware. Computer users can install anti-malware program to receive threat notifications or alerts for cyber threats. Such notifications or alerts for cyber threats can be provided to cyber analysts who assess the risk associated with malware infection to computer network entities, applications or users. For example, cyber analysts collect cyber threat information, sort the information and determine the influence of the cyber threat(s) on a computer network. The cyber analysts can then send an alert to a computer user, or network/security administrators with responsibility over the computer user's equipment, indicating the influence of cyber threat(s).

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure.

FIGS. 6A-6D provide exemplary user interface (UI) diagrams illustrating aspects of presenting and visualization of threat indicator confidence scores, according to an embodiment.

Figure 1A:
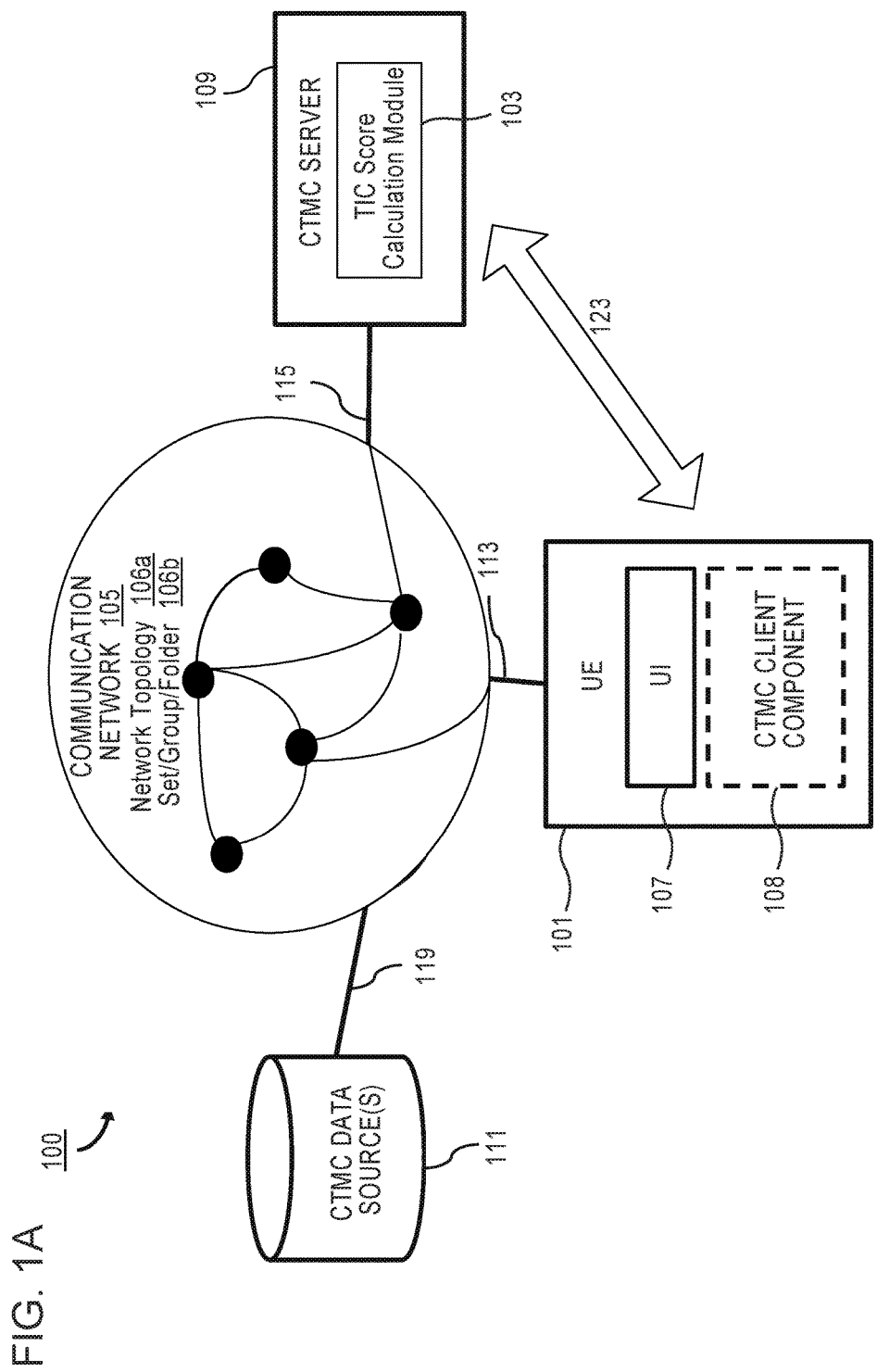
FIG. 1A provides a schematic block diagram of a communication network system in which CTMC aspects can be provided, according to an embodiment.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

SUMMARY

The cyber threat monitor and control (hereinafter "CTMC"), for example, determine risk across a global Internet network graph model for various virtual or physical network, host and application elements. In one embodiment, the CTMC may obtain information of a data model graph (e.g., a network graph reflecting structural information of network elements, and/or a factor graph that has threat indicator confidence score information) having a set of nodes and a set of edges connecting the nodes. Each node represents a virtual element or a physical element in a network, and has a probabilistic network security measure indicative of potential security risk associated with the node. Each edge represents a relationship between two nodes connected by the edge and from the plurality of nodes. The CTMC can obtain a threat indicator having a characteristic of a categorized assessment of network security risk, and then define a factor mechanism representing interactions among the plurality of nodes based on the relationship for each edge from the plurality of edges. The factor mechanism includes a factor indicative of a correlation between a pair of nodes. The CTMC may determine an influence path for the threat indicator in the data model graph based on the factor mechanism, and then propagate the threat indicator along the influence path to progressively assess influence of the threat indicator on each node in the influence path. The CTMC can calculate a first updated probabilistic network security measure for a first node on the influence path based at least in part on the characteristic of the threat indicator, and/or calculate a second updated probabilistic network security measure for a second node on the influence path based at least in part on the first updated probabilistic network security measure and the factor mechanism. Based on the updated probabilistic security measures, the CTMC dynamically updates the data model graph with the first updated probabilistic network security measure and the second updated probabilistic network security measure. The CTMC may graphically present the updated probabilistic security measures by generating a user interface that has a user interface widget representing the first updated probabilistic network security measure and the second updated probabilistic network security measure.

In one embodiment, a CTMC apparatus is disclosed. The CTMC apparatus comprises: a processor; and a memory operatively coupled to the processor. The memory stores processor-readable instructions that are executable by the processor to obtain information of a network graph having a set of nodes and a set of edges connecting the nodes. Each node has a probabilistic network security measure indicative of potential security risk associated with that node, and each edge represents a relationship between the first node and a second node connected by the edge. The processor-readable instructions are further executable by the processor to receive a first threat indicator having a first probabilistic risk measure, which represents an influence on the first node in the network graph. The processor may then calculate a first threat indicator confidence score for the first node based at least in part on the first probabilistic risk measure. If the first threat indicator representing an influence on the second node in the network graph based on the relationship, the processor generates a factor matrix having components representing a set of joint probabilistic measures, each of which indicates a joint network security status of the first node and the second node. Based on the joint probabilistic measure, the processor can calculate a second threat indicator confidence score for the second node based at least in part on the factor matrix and the first threat indicator score.

In one embodiment, a processor-implemented method is disclosed. The method can be performed by a CTMC apparatus and/or system, which obtains a network security assessment graph having a set of network elements, each of which has a probabilistic network security measure, and the probabilistic network security measure for each network element is calculated at least in part based on a first threat indicator. The CTMC apparatus or system can obtain a factor mechanism representing interactions among the set of network elements, which includes a factor indicative of a correlation between a pair of network elements from the set of network elements. When an indication of a change relating to the network security assessment graph is received, the CTMC apparatus or system determines a group of influenced network elements from the set of network elements in response to the change related to the network security assessment graph based on the factor mechanism.

The CTMC apparatus or system may then dynamically update the factor mechanism for the group of influenced network elements and dynamically updates the probabilistic network security measure for each network element based at least in part on the updated factor mechanism and the change related to the network security assessment graph.

DETAILED DESCRIPTION

The cyber threat monitor and control (hereinafter "CTMC") apparatuses, methods and systems, for example, determine risk across a global Internet data model graph (e.g., a network graph reflecting structural information of network elements, and/or a factor graph that has threat indicator confidence score information) for various virtual or physical network elements. In one implementation, the CTMC defines a data model graph structure representation of the Internet network elements (e.g., a virtual element or a physical element), including but not limited to an Internet protocol (IP) host, a classless inter-domain router (CIDR), a fully qualified domain name (FQDN), an autonomous system number (ASN), applications or application identifiers, malware, collections of networks, users, and/or the like. A probabilistic cyber security measure (e.g., a threat indicator confidence score, etc.) is calculated and/or updated for each of the network elements (e.g., nodes) in the network graph, which indicates a likelihood that the respective network element is at risk of cyber attack.

In one implementation, the CTMC leverages a factor graph to calculate and/or update a threat indicator confidence (TIC) score associated with each network element. The factor graph is a mechanism of representing probability relationships in systems with large numbers of interconnected variables, which uses a probability-based calculation of scoring to generate a TIC score as a way of considering the threat level of network elements on the Internet. Such TIC score calculation allows partial threats and intermittent threats to be handled similarly. In a further implementation, the TIC score may comprise positive and/or negative values that represent a probability security measure of an object (e.g., a node in the factor graph, and/or the network graph), and allows identification of network elements of unusual security as well as any threat observables.

For example, in one implementation, the factor graph is a mechanism that includes a network graph represented by nodes and edges that connect nodes within the factor graph. Each node in the factor graph has a TIC score vector that represents its current TIC score. For example, the TIC score vector representation can be combined with a factor matrix to calculate the influence of a threat indicator on various nodes in a factor graph, as further illustrated in FIGS. 4A-4B.

When one or more threat indicators (or observable events) are applied to a network graph (or a factor graph), a set of messages are considered to be applied to the factor graph structure to introduce new state and determine an updated TIC score vector for each node in the graph under the influence of the threat indicators. Or alternatively, influences of the threat indicators (or observable events) can be considered as messages from affected nodes in the factor graph along the edges to each other (e.g., see FIG. 4A). Messages can alter the TIC scores of a node, which may then in turn alter the TIC score associated with the message; such alterations of TIC scores of the nodes and the message itself may be dynamically updated until the factor graph of TIC scores converges. The TIC score calculations naturally handle loopy factor graphs where nodes are connected to each other either directly or indirectly in loops. The TIC score calculations include degradation over time such that the influence of indicators lessens the impact on the node in the factor graph and connected nodes. Node changes to the factor graph can occur, for example, manually by users interacting with the factor graph such that factor graph remains in sync with user assessment of scores. Additionally, various other changes can occur within the factor graph, such as but not limited to deleting/adding a node or edge, and/or the like.

In one implementation, the CTMC employs methods to dynamically calculate TIC scores within the factor graph, e.g., by attaching indicators to objects (e.g., a node in the factor graph, etc.) in the factor graph that modify the estimated threat level for that object. These indicators may be positive or negative, i.e., they respectively represent reasons for believing that an object has improved security or safety beyond the mean (positive indicator) or represent reasons for believing the object is compromised or threatening (negative indicator). In one implementation, the CTMC can incorporate online updates to the factor graph efficiently. It can incorporate new indicators by reconsidering those scores and objects that are affected by the new indicators, and thus adapts to changes in the structure of the Internet efficiently, which facilitates CTMC to be applied on factor graphs containing millions or billions of nodes.

FIG. 1A provides a schematic block diagram of a communication network system in which CTMC aspects can be provided, according to an embodiment. A communication network system 100 can include one or more user devices or user equipments (UEs) 101, each equipped with at least a user interface (UI) 107; one or more CTMC servers 109 including a CTMC calculation module 103; one or more data source(s) 111, which are connected via a communication network 105. The communication network 105 can be represented by a data graph model such as a network graph that includes Internet topology information 106a, virtual network element grouping/folder information 106b, etc. Any of the devices or servers of the communication network system 100 can be equipped with local memory/storage spaces (not shown in FIG. 1A). Furthermore, the devices and servers of the communication network system 100 may have access to centralized or distributed memory/storage spaces (not shown in FIG. 1A) through the communication network 105. Thus, FIG. 1A is merely an example illustrating the types of devices and modules that can be included within a communication network system 100.

Communication network 105 can be any communication network, such as the Internet, configurable to allow the one or more UEs 101, the one or more TIC servers 109, and the TIC data sources 111 to communicate with communication network 105 and/or to each other through communication network 105. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the UEs 101 can be operatively coupled to a cellular network; and the TIC data source(s) 111 can be operatively coupled to a fiber-optic network. The cellular network and fiber-optic network can each be operatively coupled to one another via one or more network bridges, routers, switches, and/or gateways such that the cellular network, the Ethernet network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network. In various implementations, the different types and/or collections of networks can be modeled into a network graph.

As illustrated in FIG. 1A, UEs 101 are operatively coupled to communication network 105 via network connection(s) 113; CTMC servers 109 are operatively coupled to communication network 105 via network connection(s) 115; and CTMC data source(s) 111 are operatively coupled to communication network 105 via network connection(s) 119. Network connections 113, 115, and 119 can be any appropriate network connection to operatively couple UEs 101, the CTMC servers 109, and the data source(s) 111. In an alternative implementation, the CTMC server 109 can have a direct connection with the UEs 101 via a communication connection 123.

A network connection can be a wireless network connection such as, for example, a wireless fidelity ("Wi-Fi®") or Wireless Local Area Network ("WLAN") connection, a Wireless Wide Area Network ("WWAN") connection, and/or a cellular connection. A network connection can be a wired connection such as, for example, an Ethernet connection, a Digital Subscription Line ("DSL") connection, a broadband coaxial connection, and/or a fiber-optic connection.

As mentioned above, in some instances, a communication network system 100 can include more than one UE 101, more than one CTMC server 109, and more than one data source 111. A UE 101, and/or a CTMC server 109, each of which can be operatively coupled to the communication network 105 for example by heterogeneous network connections. For example, a first UE 101 can be operatively coupled to the communication network 105 by a WWAN network connection, another UE 101 can be operatively coupled to the communication network 105 by a DSL network connection, and a CTMC server 109 can be operatively coupled to the communication network 105 by a fiber-optic network connection.

The CTMC server(s) 109 each can be, for example, a web server configured to provide search and/or data analytics capabilities to electronic devices, such as UEs 101. The UE 101 can be in communication with the CTMC server(s) 109 via the communication network 105, while the communication is managed by the CTMC client component 108. In one implementation, the CTMC server(s) 109 can be a remote server housed separately from the UE 101, where the CTMC client component 108 can include an application (e.g., a browser application, a mobile application, etc.) instantiated on a user device (e.g., a Smartphone, a computer, a workstation, a personal digital assistant, etc.). For example, the CTMC client component 108 can send a signal representing a control command (e.g., user submitted parameters, etc.) to the CTMC server(s) 109 for TIC score calculation (which can be performed by the TIC calculation module 103), where the results of the calculation may be presented via the UE 101. In another example, the TIC calculation module 103 at a CTMC server 109 can calculate a TIC score on the global Internet topology 106a and group/folder information 106b of the communication network 105, and a CTMC client component 108 at the UI 101 can receive the TIC score via the communication network 105. In another implementation, the TIC server(s) 109 may be integrated with the UE 101 including the CTMC client component 108. For example, the CTMC server 109 and UE 101 can collectively act as an integrated computing device operated by a user, and communicate with various entities such as a user, data source, and/or the like, for cyber threat analytics. A detailed discussion of functional module(s) and data store(s) of the CTMC server 109 (e.g., when integrated with a UE 101) is provided in FIG. 2A.

The UEs 101 can be any of a variety of electronic devices that can be operatively coupled to communication network 105. A UE 101 can be, for example, a personal computer, a tablet computer, a personal digital assistant (PDA), a cellular telephone, a portable/mobile internet device, television, kiosk display, display screens in vehicles, projection devices, laser display devices, digital display watches, digital display glasses and/or some other electronic communication device with audio and/or visual capabilities. A UE 101 can also be, for example, a television set, a streamer device, a set top box, or any other electronic device equipped with a display unit (a UI 107) and a network connection 113 that enables the device to run applications with real-time contents received via the network connection 113 on an operating system. The UEs 101 each can include a web browser configured to access a webpage or website, for example, the CTMC client component 108, which can be accessible over communication network 105. The UEs 101 can be configured to support, for example, Hyper Text Markup Language (HTML) using JavaScript. For example, the UEs 101 can include a web browser, such as, Firefox®, Safari®, Dolphin®, Opera®, Internet Explorer (IE)®, Chrome® and/or similar browsers. An Internet page or website can be accessed by a user of a web browser at a UE 101 by providing the web browser with a reference such as a uniform resource locator (URL), for example, of a webpage. For example, a user of a UE 101 can access a CTMC server 109 via a URL designated for the CTMC server 109. In some instances, UEs 101 each can include specialized software other than a browser for accessing a web server such as, for example, a CTMC server 109. Specialized software can be, for example, a specialized network-enabled application or program. In some instances, portions of a website accessible via a web server can be located in a local or remote memory space/data store accessible to the web server. A UE 101 can also include a display, monitor or user interface (UI) 107, a keyboard, various ports (e.g., a USB port), and other user interface features, such as, for example, touch screen controls, audio components, and/or video components (each not shown).

Data source(s) 111 can be distributed sources of data throughout the communication network system 100. A data source 111 can be one or more of a database, a data warehouse, a file, etc.

Figure 1B:
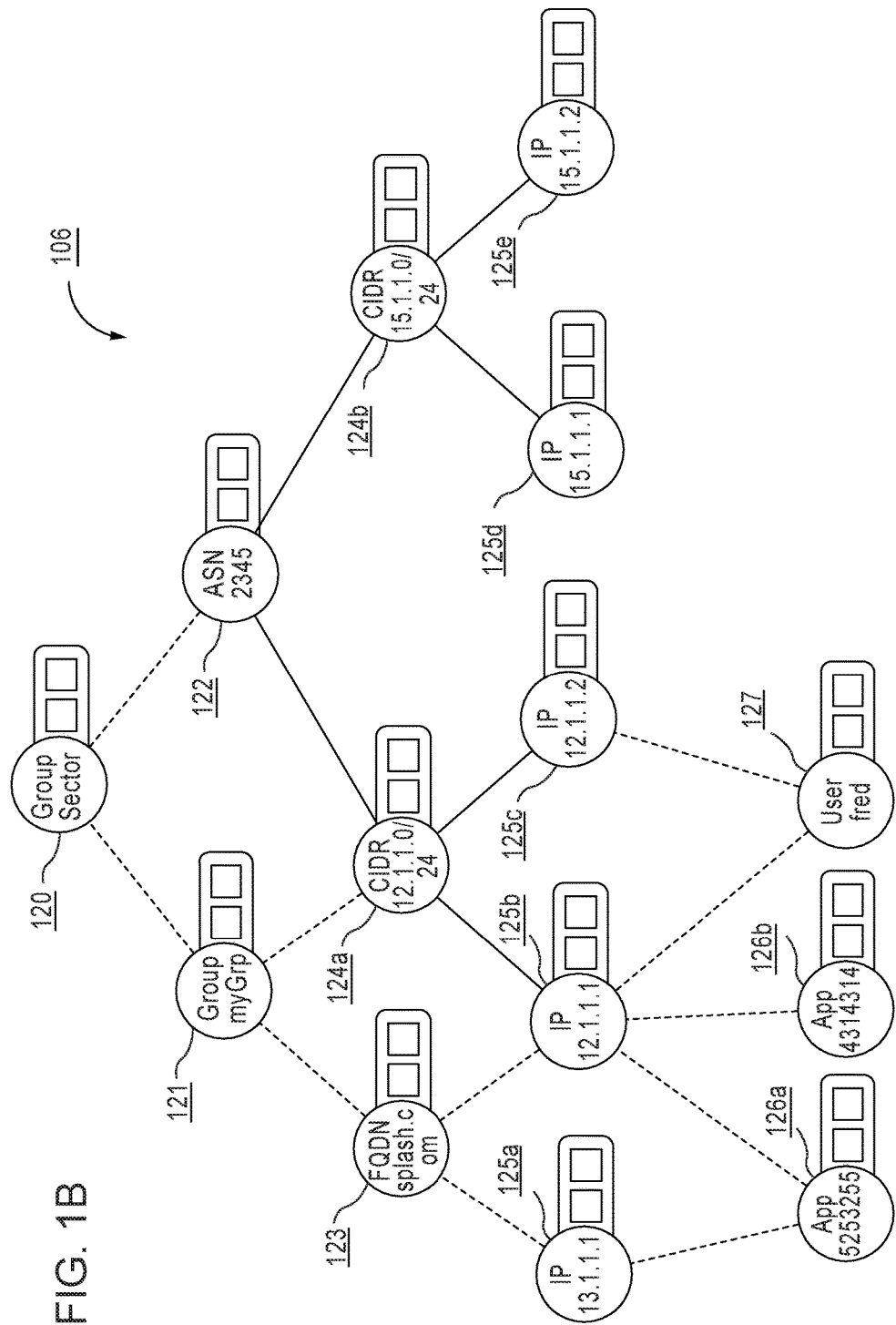
FIG. 1B provides an example network graph illustrating aspects of providing a threat indicator confidence score for various network, application, user and organizational elements, according to an embodiment.

FIG. 1B provides an example data graph (e.g., the data model of communication network topology information 106a and folder/group information 106b) illustrating aspects of providing a threat indicator confidence score for various network elements, according to an embodiment. The CTMC may model the communication network 105 (as shown in FIG. 1A) as a factor graph of connected entities that intercommunicate, which can be used to model relationships and dependencies that exist in the computer network 105. Because the threat level of a particular entity in the Internet can be dependent on its relationships to other objects on the internet, the CTMC adopts a method that incorporates a model of the inter-relationships to estimate the threat level of Internet entities. For example, as shown in FIG. 1B, the CTMC may model all relevant objects in a network (e.g., virtual or physical network elements, etc.), including IP hosts (e.g., 125a-e), FQDNs (e.g., 123), CIDRs (e.g., 124a-b), ASN (e.g., 122), groups (e.g., 121), applications (e.g., 126a-b), malware, users (e.g., 127), sectors (e.g., 120), actors, and/or the like. The factor graphs also contain edges that connect two objects and represent the relationships between the two objects.

Figure 2A:
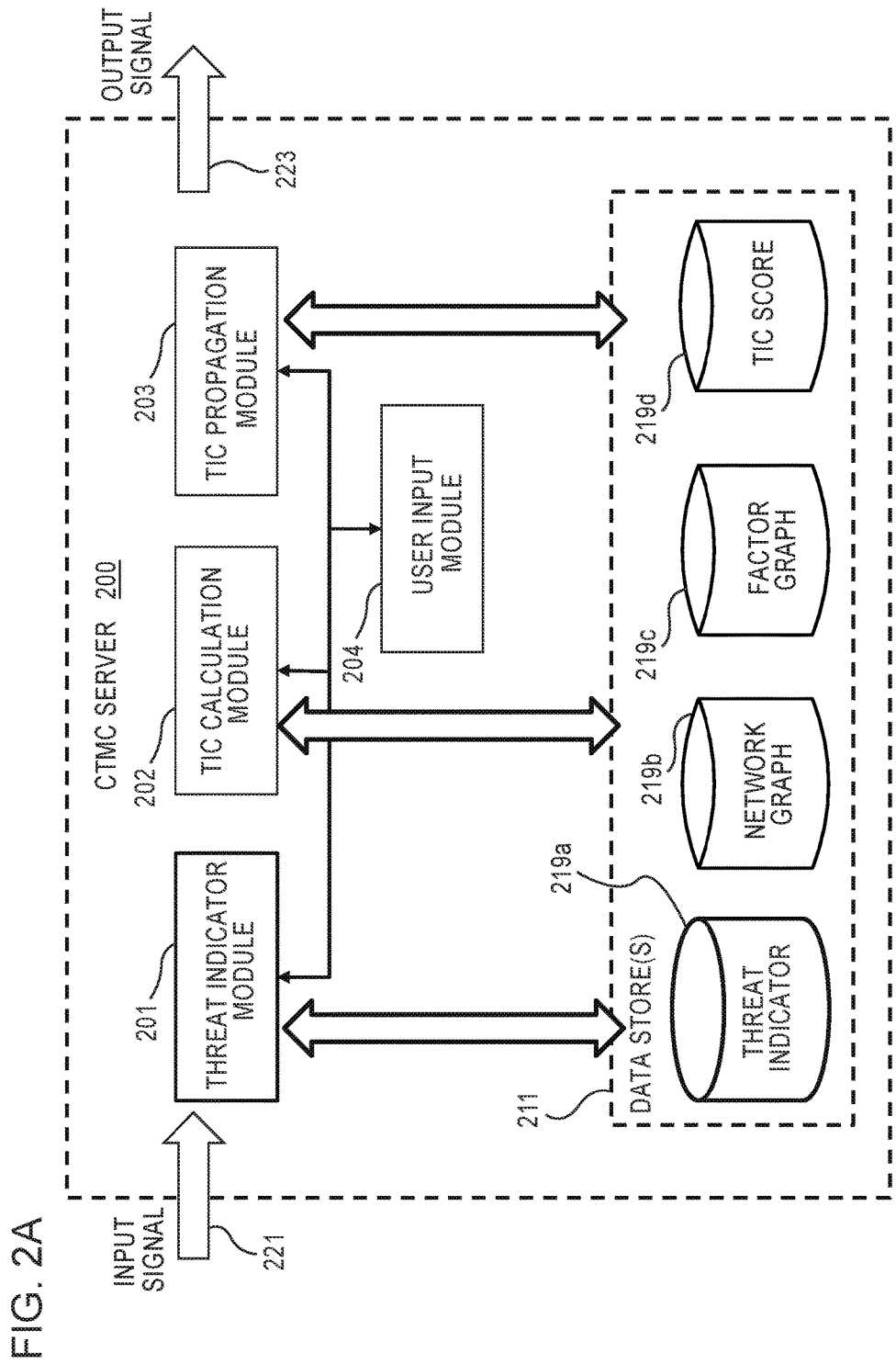
FIG. 2A is a schematic illustration of components and/or modules within a CTMC server, according to an embodiment.

FIG. 2A is a schematic illustration of TIC components and/or modules of a CTMA server (e.g., 109 in FIG. 1A), according to an embodiment. The CTMC server 200 can be similar to the CTMC server 109 of FIG. 1A. As shown in FIG. 2A, a CTMC server 200 can include a threat indicator module 201, a TIC calculation module 202, a TIC propagation module 203, a user input module 204, and/or the like. A data store(s) 211 can include a threat indicator table 219a, a network graph data store 219b, a factor graph data store 219c, a TIC score table 219d, and/or the like. Furthermore, the CTMC server 200 communicates with other devices of a communication network system (e.g., communication network system 100 of FIG. 1A) via input signal 221 and output signal 223.

In various instances, the CTMC server 200 and its components can be located anywhere within a communication network system 100 such as that shown in FIG. 1A. Including, but not limited to, within the UEs 101, or in separate locations within the communication network system 100 of FIG. 1A. The CTMC server 200 can also be provided as on-premise deployment, via private computation clouds, or be embedded into other software or bundled into devices by Original Equipment Manufacturers (OEMs).

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

In some embodiments, the CTMC server 200 can provide an analytics platform as a Software as a Service (SaaS) such that, for example, the TIC services are centrally hosted on the information cloud (not shown) for independent software vendors, system integrators, analytics consultants, enterprises, etc., to build multi-tenant business intelligence and embedded analytics solutions for external and internal customers and/or users, for example, by using a browser. The CTMC server 200 can enable users to mashup data from various sources for real-time ad-hoc analysis, build reports with rich visualizations and dynamic dashboards, and collaborate in-place among stakeholders to make informed decisions. The CTMC server 200 can provide capability of reducing data into smaller parts or views that can yield more information (e.g., slice and dice), drill downs and search on data. For example, a multi-dimensional data structure can be considered as a data cube, and the act of picking a rectangular subset of a data cube by choosing a single value for one of its dimensions can define a new data cube with one fewer dimension (e.g., slice operation). Other operations can produce sub-cubes, for example, by allowing an analyst to pick specific values of multiple dimensions (e.g., dice operation). Furthermore, a drill down/up operation allows the user to navigate among levels of data ranging from the most summarized (up) to the most detailed (down).

In some instances, the CTMC server 200 receives an input signal 221 representing a threat indicator at the threat indicator module 201. The threat indicator module 201 processes the threat indicator to obtain characteristics of the threat indicator, the data structure of which is discussed in FIG. 2B. The threat indicators can be stored at the threat indicator table 219a.

In other instances, the UE 101 in FIG. 1A, for example, can be equipped with input device(s) and a user can enter input signals representing threat indicator visualization settings, parameters, and/or the like, which can be processed by the user input module 204.

In some instances, the TIC calculation module 202 can calculate or dynamically update a TIC score based on a network graph data store 219b and/or a factor graph store 219c in the data store 211. For example, the TIC propagation module 203 can propagate a threat indicator received at the threat indicator module 201 along a network graph data store 219b, to calculate updated TIC scores for influenced network elements in the network graph, based on a factor graph store 219c. Calculation examples based on the network/ factor graph are further introduced in FIGS. 4A-4C. The calculated TIC scores can be stored at a TIC score table 219d.

In various instances, the output signal 223 may include a variety of data outputs, such as a generated TIC score, information for a visual presentation (e.g., data plots, charts, etc.) of the TIC score, and/or the like. Example TIC score visualization UI are provided in FIGS. 6A-6D and discussed in further detail below.

Figure 2B:
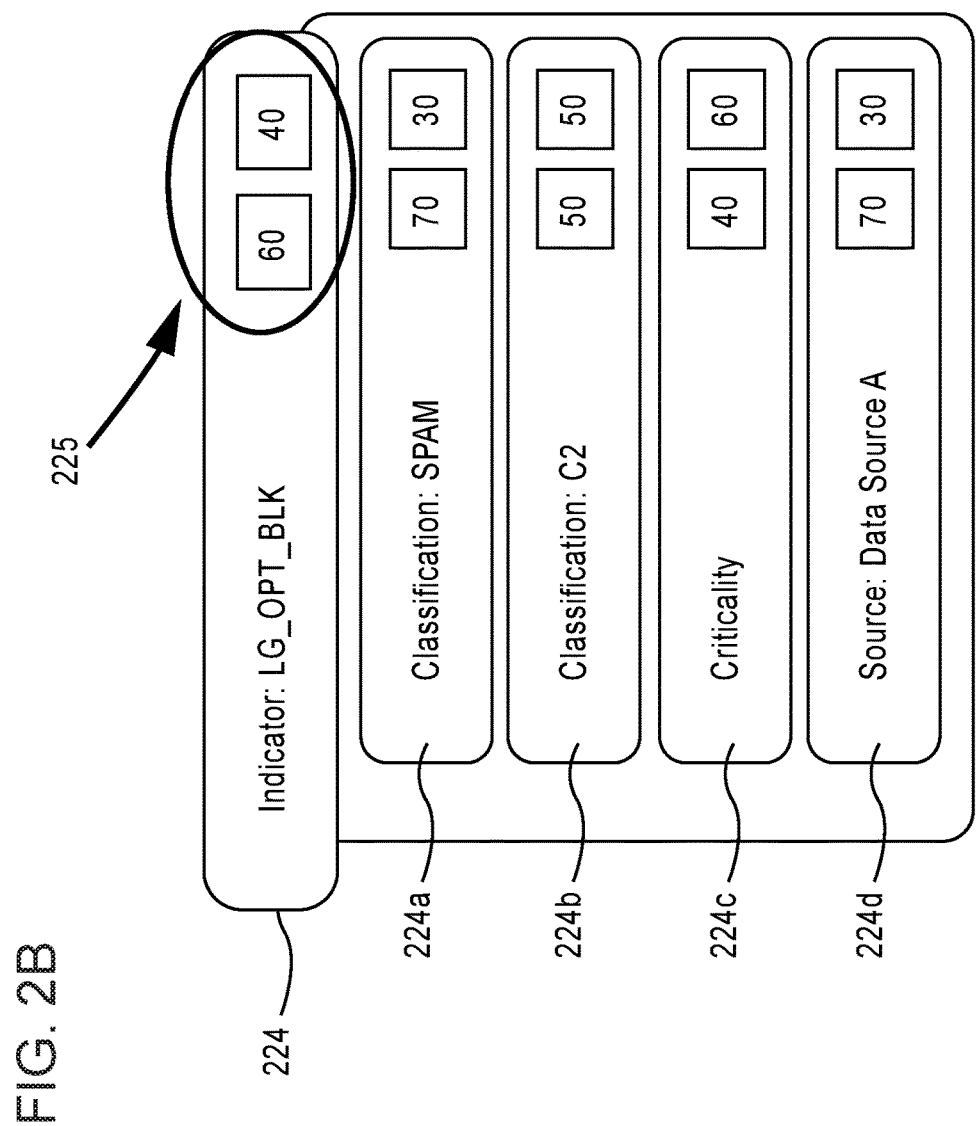
FIG. 2B provides an example diagram illustrating a graphical representation of a threat indicator, according to an embodiment.

FIG. 2B provides a diagram illustrating an example data structure of a threat indicator, as received at the threat indicator module 201 in FIG. 2A, according to an embodiment. As shown in FIG. 2B, the threat indicator 224 (that may also represent an observable event, change, and/or the like) is a named entity that includes a categorized assessment of risk (e.g., the assessment of risk with respect to a type of malware, risk from a particular source, etc.). The threat indicator 224 may have various characteristics, such as but not limited to one or more classifications 224a-b, one criticality 224c, one source 224d, and all such attributes impact an overall TIC score 225 of the threat indicator, and/or the like.

In one implementation, the threat indicator 224 has a TIC score 225, which is a vector with positive and negative assessments, the values of which represent a probability that the threat indicator is "threatening" or "safe." Both positive and negative assessments are included by the TIC score calculation module 202.

The TIC scores associated with the threat indicators impact the TIC score of an object, or a network element in a network graph.

For example, in connection with FIG. 1B, each node in the Internet model graph, representing an object (or a network element), is assigned a probability of being "threatening" or "safe" (threatening is defined as one minus the probability of safe and vice versa). This probability could represent: 1) the possibility that this object is a threat, 2) the severity of the threat that the object represents, and 3) the level of belief that a cyber analyst has that this object is a threat to the network. Although these are different concepts, they can all be represented using the same approach. Each of the possibilities (1)-(3) may be converted into a "probability" that the object is threatening, by mapping the concept to a value between one and zero as illustrated below:

TABLE 1

Example TIC Score Interpretation

| Interpretation | Meaning of 1 | Meaning of 0 |
| --- | --- | --- |
| Probability of threat | Object absolutely is a threat | Object absolutely is safe |
| Severity of threat | Object is the most severe possible threat | Object is the most safe thing possible |
| Belief of threat | Threat beyond all doubt | Safe beyond all doubt |

In one implementation, by using probability methods to calculate the TIC score, the CTMC system can take advantage of statistical methods to analyze aspects of the TIC score calculation module system, which allow the CTMC system to learn how to produce TIC scores from examples scored by human cyber analysts, make and validate hypotheses about the state of the Internet, and find hidden cause-and-effect relations that may not be immediately apparent. Although the TIC score may be expressed as a single value, the TIC score can include a two-valued vector with both a threat component and a safety component (e.g., see 225), e.g., a 'TIC score vector," where the components sum to 1. This two-component description helps avoid issues with round-off error when the threat or safety probability becomes close to 1.

Figure 3A:
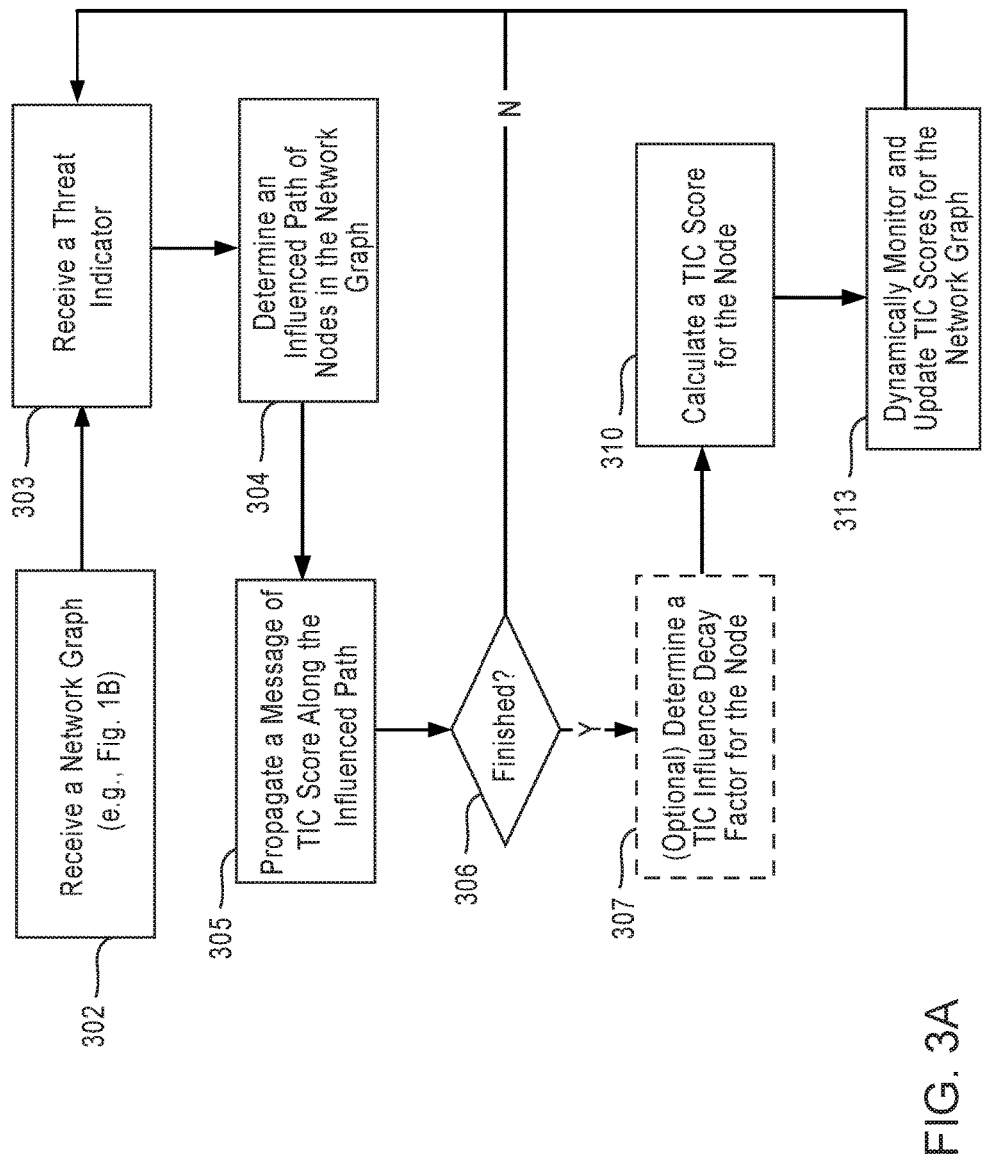
FIGS. 3A-3B provide example logic flow diagrams illustrating work flows for calculating and updating a threat indicator confidence score for a network element, according to an embodiment.
Figure 3B:
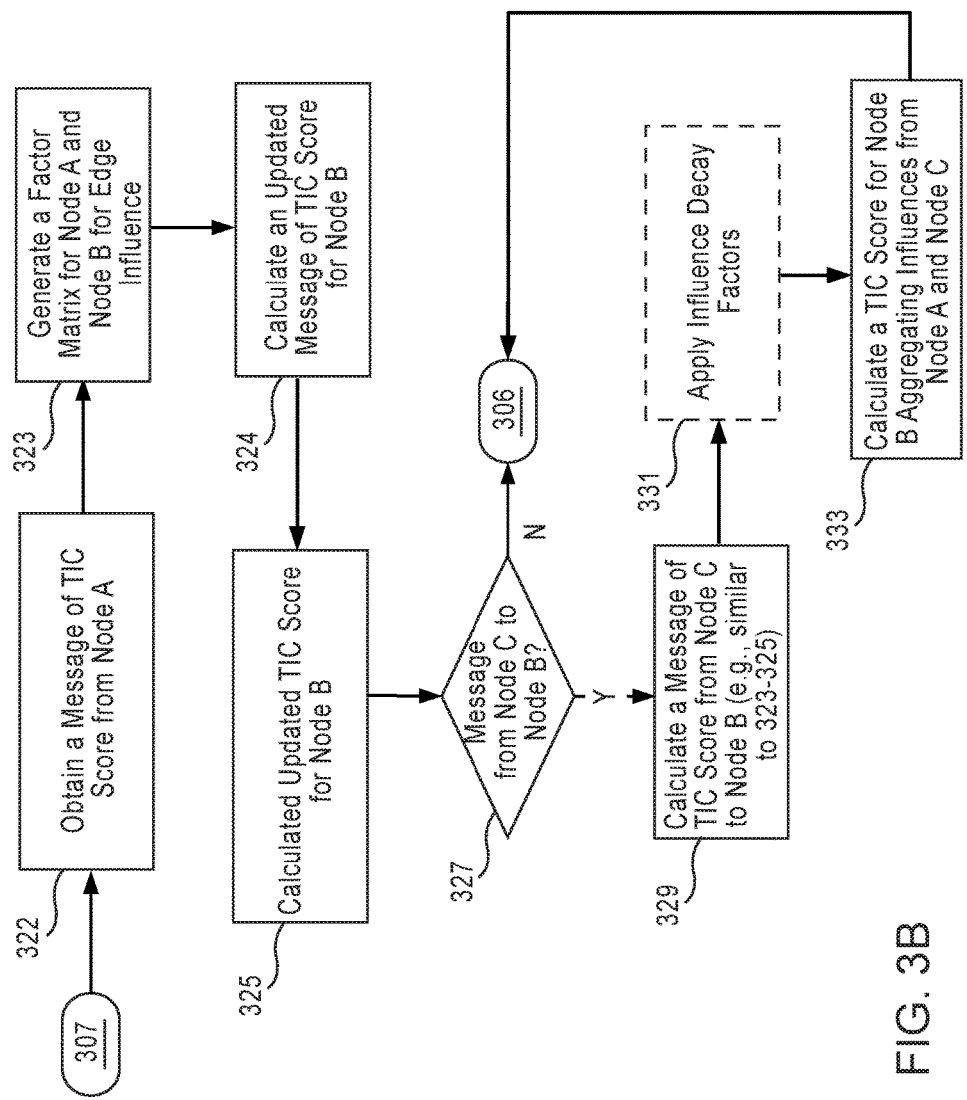

FIGS. 3A-3B provide example logic flow diagrams illustrating work flows for calculating and updating a threat indicator confidence score for a network element, according to an embodiment. For example, FIG. 3A may provide a work flow that is performed by the TIC calculation module 202 in FIG. 2A; and FIG. 3B may provide a work flow that is performed by the TIC propagation module 203 in FIG. 2A. Starting with FIG. 3A, the CTMC may obtain a network graph 302, e.g., by loading the network graph data from the network graph data store 219b. An example network graph is illustrated in FIG. 1B. The CTMC may then receive a threat indicator that applies to an element of the network graph at 303, and may then determine an influenced path of nodes in the network graph at 304. For example, the influenced path includes a set of nodes (or elements) in the network graph that are directly or indirectly connected to a source node to which the threat indicator is originally applied, and the influence decays at nodes that are further away from the source node. In another example, the influence path may be determined by the structure and/or type of the network elements, e.g., when a threat indicator is applied to a CIDR, all the IPs associated with the CIDR are affected by the threat indicator (e.g., see FIG. 4B).

In one implementation, the CTMC may propagate a message of TIC score along the influenced path at 305, to calculate an updated TIC score for each node within the influenced path. Detailed numeric examples of message propagation for TIC score calculations are further discussed in FIGS. 4A-4C. During the propagation, the CTMC may determine whether every node has been updated within the influenced path at 306. If the updating is finished, the CTMC may monitor further changes and/or threat indicators at 303. If not, the CTMC may calculate a TIC score for the node progressively based on the message propagation at 310.

In one implementation, the CTMC may optionally determine a TIC influence decay factor, e.g., a factor that shows a degrading correlation strength over time (e.g., based on a historical degradation) when propagating the TIC score message along the influenced path at 307. For example, the influence of a threat indicator and/or a change in the threat indicator may decay over time, and/or along the influenced path, e.g., the further the message propagates from the source (e.g., the original node at which the threat indicator arrives, etc.), the less its influence is. To obtain a decay factor, the ratio of threat-to-safety can be, for example, gradually driven towards 1 according to an applied exponential decay term. To implement this effect, the CTMC can build an associated message queue that stores the TIC score messages, which is periodically examined over time is assumed to determine which influences are to be readjusted to be consistent with the current time. Adjustment takes place by determining a decay ratio associated with threat indicator influence for the current time, setting the influence to be consistent with the current time, and propagating the new influence (scaled by the new decay ratio) through the factor graph. Once the decay ratio gets sufficiently close to 1 (i.e., within a pre-determined threshold), the influence can be safely removed from the network graph without significantly affecting the TIC scores of nodes in the factor graph.

Upon updating TIC scores for each node within the influenced path, the CTMC may dynamically monitor threat indicators (e.g., at 303), and update TIC scores for the network graph at 313 (e.g., in response to any change to the graph structure, threat indicator characteristics, and/or the like).

FIG. 3B illustrates a work flow for propagating a message along an edge in the network graph to calculate an updated TIC score (e.g., 310 in FIG. 3A). The CTMC can define a mathematical graph structure from machine learning theory called a factor graph to determine the influenced path. Factor graphs are a general method of representing probability relationships in systems with large numbers of interconnected variables. The method of exploring the relationships between the variables to predict the values of other variables is called belief propagation.

Upon obtaining a message of TIC score from node A at 322, the CTMC may define a factor matrix for node A and node B for edge influence at 323. The factor matrix can be a mechanism in a matrix representation form, that represents the joint relationship between two nodes. Before the influence can get across the edge, the effects of the connection (between node A and node B) on the strength of the influence are taken into account. To calculate how edges affect TIC score messages passing from one node to another, the factor matrix includes the joint probabilities of threat and safety between the objects connected by the edge, e.g., a joint probability is the probability that both node A and B are in states of threat or safety at the same time. Unlike a single node, which has a 2-vector describing its threat/safety probabilities, two nodes can have four different threat and safety states. ({A=threat, B=threat}, {A=threat, B=safe}, {A=safe, B=threat}, {A=safe, B=safe}). Each of these four different states has its own probability value and all four sum to one.

Each term of the factor matrix is the joint probability of the two conditions, divided by the single term probability of both conditions. For instance, the term relating to {A=threat, B=threat} is the probability of {A=threat, B=threat} divided by the product of the probability of {A=threat} and {B=threat} separately. If this term is greater than 1, then the probability of node A being a threat and node B being a threat reinforces each other. If this term is less than 1, then the probabilities impede each other. The four terms form two columns and two rows. The two columns represent the threat/safety states of node B and the two rows represent the threat/safety states of node A.

The factor matrices between two nodes can also be thought of as representing logical operations. These are the equivalent matrices for logical relations between two binary nodes. When assigning these matrices to a graph, the 0 values can be given slight positive values, unless the user is absolutely convinced of the logical exactness of the statements. This will allow for occasional cases that violate the rules to be handled effectively and will improve convergence. For example, example factor matrices and the corresponding logical operations can be found below:

$$\begin{bmatrix} 1 & 0 \\ 0 & 1 \end{bmatrix} \equiv A = B$$

$$\begin{bmatrix} 0 & 1 \\ 1 & 0 \end{bmatrix} \equiv A \neq B$$

$$\begin{bmatrix} 1 & 1 \\ 1 & 1 \end{bmatrix} \equiv A \perp B$$

$$\begin{bmatrix} 1 & 0 \\ 1 & 1 \end{bmatrix} \equiv \begin{array}{c} A \Rightarrow B \\ \text{or} \\ \neg B \Rightarrow \neg A \end{array}$$

$$\begin{bmatrix} 1 & 1 \\ 0 & 1 \end{bmatrix} \equiv \begin{array}{c} \neg A \Rightarrow \neg B \\ \text{or} \\ B \Rightarrow A \end{array}$$

$$\begin{bmatrix} 1 & 1 \\ 1 & 0 \end{bmatrix} \equiv \begin{array}{c} \neg A \Rightarrow B \\ \text{or} \\ \neg B \Rightarrow A \end{array}$$

$$\begin{bmatrix} 0 & 1 \\ 1 & 1 \end{bmatrix} \equiv \begin{array}{c} A \Rightarrow \neg B \\ \text{or} \\ b \Rightarrow \neg A \end{array}$$

To calculate the influence of the edge or an updated message of TIC score for node B, for a TIC score message coming from node A to node B, the message received from node A is multiplied by the factor matrix to generate a TIC score message sent to node B, at 324. To calculate the probabilities in the TIC score message coming from node B to node A, the message of probabilities received from node B is multiplied by the transpose of the factor matrix to generate the TIC score message sent to node A. In this way, the updated TIC score for node B can be calculated with the influence from node A at 325. Detailed numeric examples of factor matrix operations for propagation of a message are provided in FIGS. 4A-4C.

If there are multiple influences from different nodes, e.g., an additional message from node C to node B, at 327, the CTMC can calculate a message of TIC score from node C to node B using a factor matrix defining the relationship between node C and node B at 329, which can be similar to the definition of factor matrix for nodes A and B. The CTMC may also optionally apply an influence decay factor at 331, and then calculate a TIC score for node B aggregating influences from node A and node C at 333, e.g., by taking the sum. For example, if it is desired that the effects of the edge decay over time are considered, then the TIC score message passing through the edge is adjusted by an edge decay factor. The CTMC can let these influences decay over time. Alternatively, the edge can be temporarily preserved and the factor matrix terms are gradually relaxed towards 1. Once the terms are identically 1, then the edge can be permanently deleted. The first choice preserves the old message behavior at the time of deletion, while the second choice allows the edge to propagate changing messages, but they eventually become less and less significant.

If no other message is received at 327, the CTMC may proceed to monitor threat indicators or any change at 306. In one implementation, changes may include graph structural changes in the relationships between nodes. If an edge is added, then a message is being passed between two nodes where there was not one before. It could also be considered as switching from the 'independence' message (i.e. [0.5, 0.5]) to an informational message. If an edge is deleted, then the message stops propagating (or the TIC score message is considered as an 'independence' message that no longer propagates to other nodes). If it is desired that a node be added/deleted, then note that the node will not affect the rest of the graph until the edges are added/deleted. Therefore, once edge addition/deletion is handled, then all graph changes are handled.

When an edge is added to the network graph, the CTMC adds the edge and propagates out the two new messages created on each side of the edge. To delete an edge, the factor matrix is changed to [[1, 1], [1, 1]], and the CTMC can propagate the resultant messages (which should both be [0.5, 0.5]) and then delete the edge.

Figure 4A:
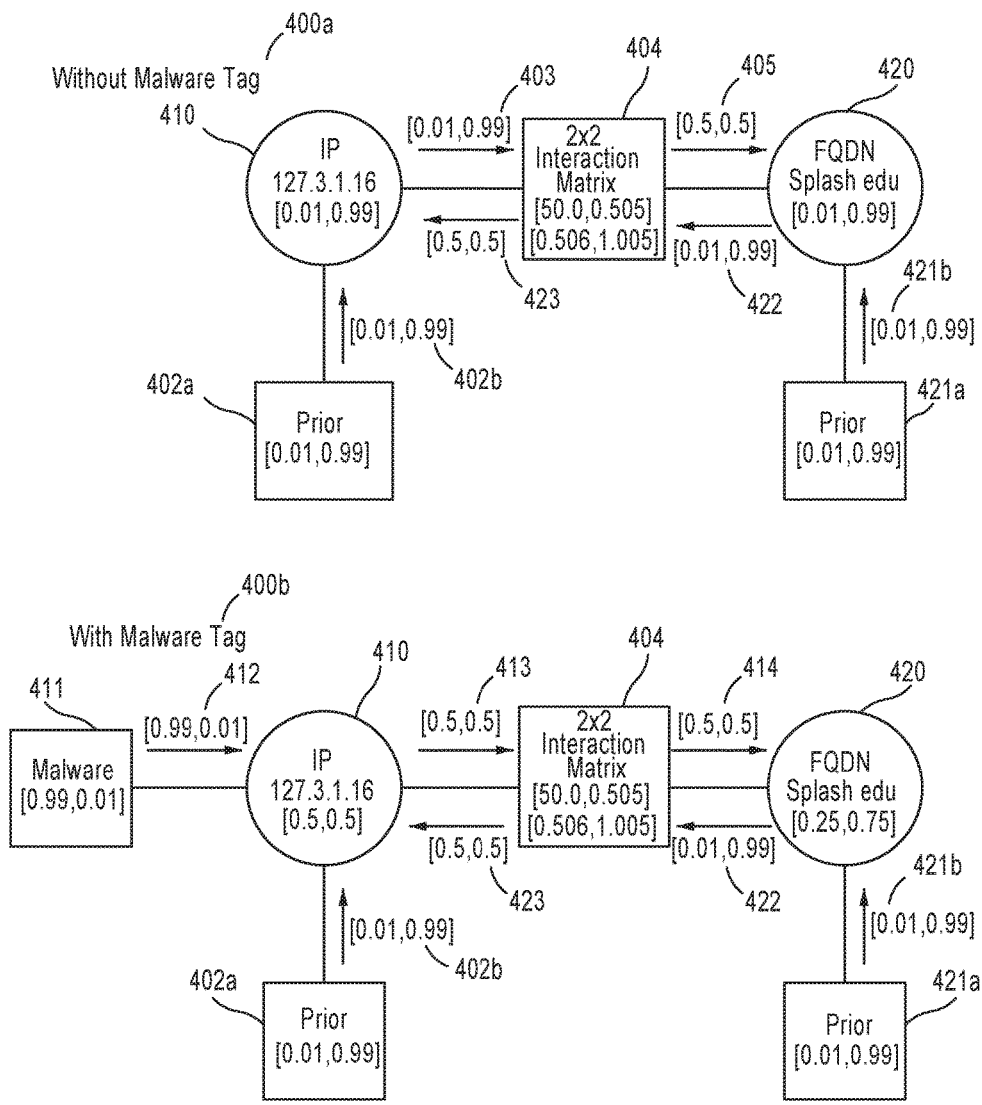
FIGS. 4A-4C provide example graph diagrams illustrating propagating a threat indicator through a network graph to update threat indicator confidence scores for influenced network elements, according to an embodiment.
Figure 4B:
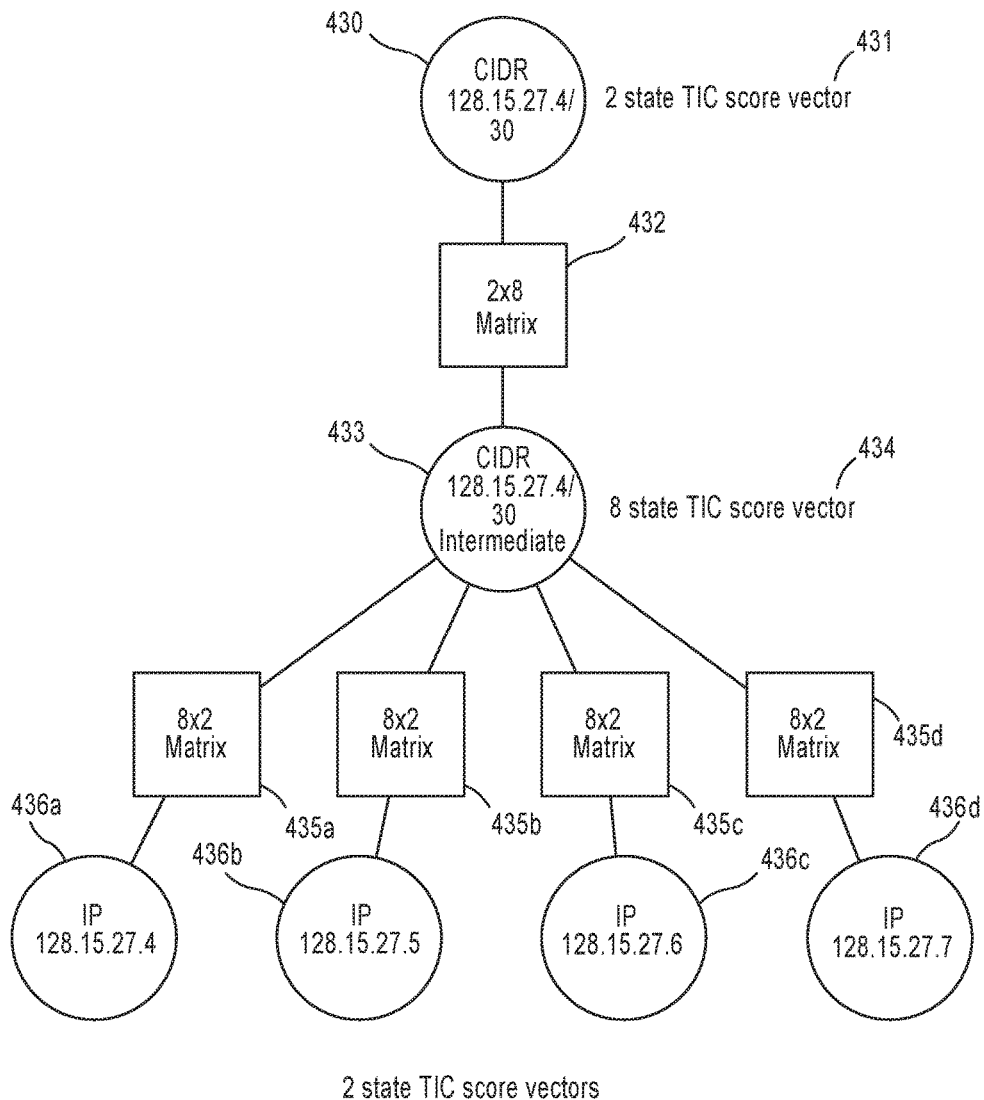
Figure 4C:
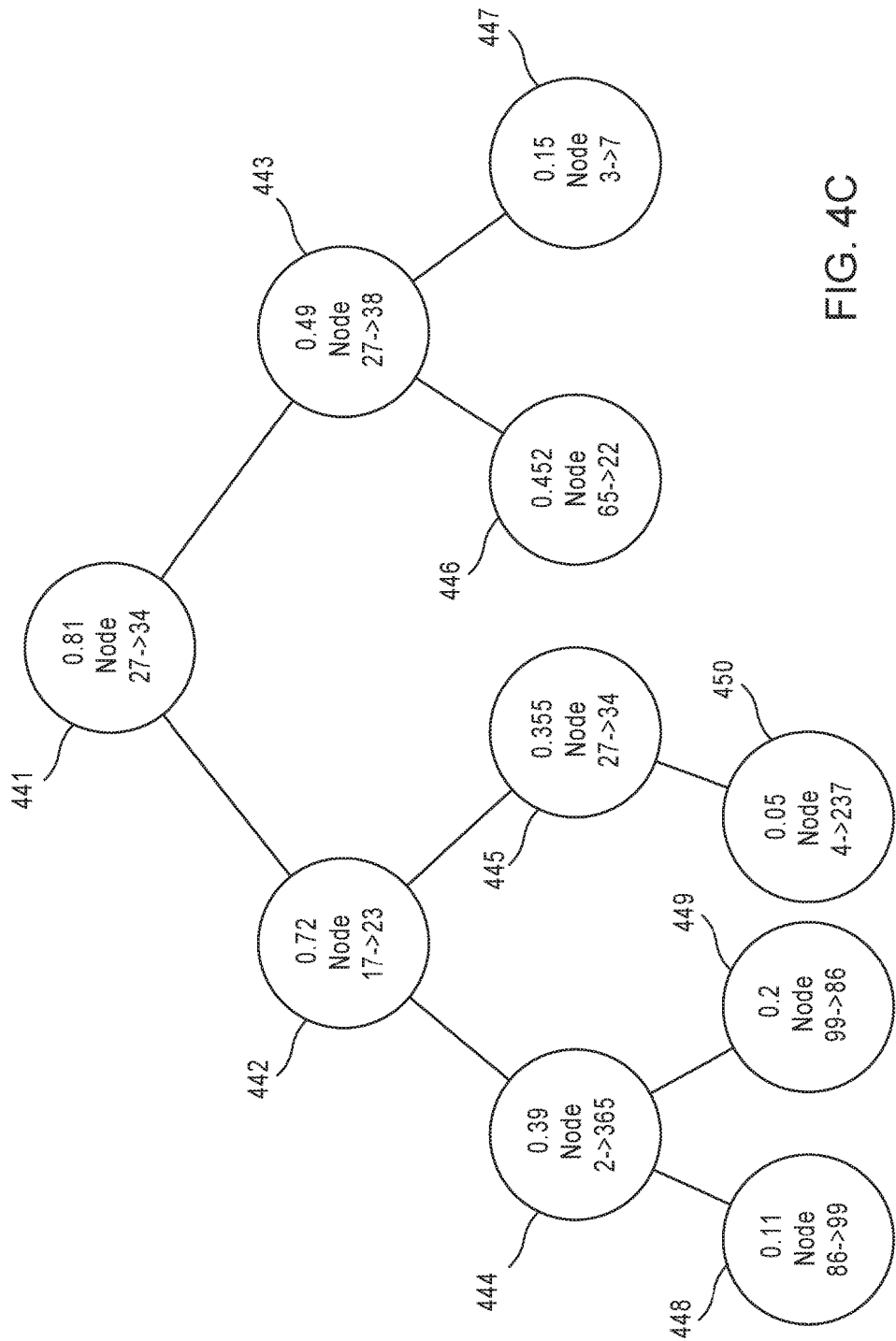

FIGS. 4A-4C provide example graph diagrams illustrating propagating a threat indicator through a network graph to update threat indicator confidence scores for influenced network elements, according to an embodiment. FIGS. 4A-4C provide numeric examples to the work flow diagrams as illustrated in FIGS. 3A-3B.

For example, in one implementation, for a single object with no connections to other objects and no external influences in the network graph, an inherent TIC score for the object is based on the fact that the object merely is an object of its type, e.g., the 'prior' TIC score. This prior TIC score is set by an attached influence that all objects in the model of the Internet have called a 'prior' influence. The prior TICD score of an object can be quickly derived from a global list of prior TIC scores associated with each object type. For example, without considering any malware tag (400a), a prior TIC score for IP addresses (410) may be [0.01, 0.99] (e.g., 402a), meaning that it has a TIC score of 1, is threatening with a probability of 1 out of 100 and is safe with a probability of 99 out of 100. The TIC score is calculated as the probability of a threat times 100, rounded to the nearest integer.

In another implementation, objects can influence one another. Two objects that are associated with each other are joined by an edge in the network graph and can send influences to each other along the edge to represent that interconnection, e.g., see 403, 405, 422, 423, etc. in FIG. 4A. The influence that an object sends into an edge is the element-multiplied vector of all the other influences affecting that object; except any incoming influence from that edge.

For example, as shown in FIG. 4A, for IP host (labeled 127.3.1.16), e.g., 410, and an FQDN (420) (labeled splash.edu), if 127.3.1.16 is an IP address that splash.edu can resolve to, then these Internet objects are connected and their TIC scores influence each other. If splash.edu 420 has been found to be compromised/safe, then it is evident that 127.3.1.16 410 is compromised/safe, and vice versa. Therefore, if 127.3.1.16 410, has prior TIC score [0.01, 0.99] (402b), the message of the influence of IP host 410 may be passed to FQDN (420), in the form of [0.01, 0.99] (403). On the other hand, when splash.edu (420) and the IP address (410) are linked, the affected value of splash.edu (420) can be calculated. Suppose that splash.edu (420) has the same prior TIC score as 127.3.1.16 ([0.01, 0.99] 421a-b) and that half the time 127.3.1.16 410 is threatening, then splash.edu (420) is threatening, and vice versa. The interaction/factor matrix (404) coupling the two is therefore [[50.0, 0.505], [0.505, 1.005]]. Thus, the influence vector on FQDN (420) from the IP address (410) can be calculated by multiplying the TIC score vector 403 by the factor matrix 404, which results in the score [0.5, 0.5] (405). This means that the TIC score of IP 127.3.1.16, once the malware tag is added, will change from 1 to 50, e.g., is threatening with a probability of 50 out of 100 and is safe with a probability of 50 out of 100. Similarly, the influence vector on IP address (410) from FQDN (420) can be calculated by multiplying the TIC score vector 422 by the factor matrix 404, which results in the score [0.5, 0.5] (423)

In one implementation, when there is external influence, e.g., a malware attack (411), the TIC score for an object, after all the external influences are applied, is a vector that is normalized (multiplied by a constant to adjust the sum of the elements to 1) after element multiplying all the influences on the object (including the prior TIC score of the object). For example, under the malware tag (400b), if the prior for the IP address (410) is [0.01, 0.99] (402a) and applied influences [0.99, 0.01] (negative influence due to malware), then the total TIC score for the IP address (410) is normalized ([0.01*0.99, 0.99*0.01]) or normalized ([0.5, 0.5]).

Under the malware influence [0.99, 0.01] (412) from a malware (411), the IP address (410) sends the message normalized ([0.01*0.99, 0.99*0.1]) or [0.5, 0.5] (413) to splash.com (420). Splash.edu (420) will send its own message (422) to IP 127.3.1.16 (410). These messages will then provide the mutual influences used for the TIC scores of both to be calculated. If splash.edu (420) and the IP address (410) are linked, the affected value of splash.edu 420 can be calculated. Suppose that splash.edu (420) has the same prior TIC score as 127.3.1.16 ([0.01, 0.99] 421a) and that half the time 127.3.1.16 (410) is threatening (e.g., see 413), then splash.edu (420) is threatening, and vice versa. Under the interaction/factor matrix (404) coupling the two [[50.0, 0.505], [0.505, 1.005]], the message sent from IP 127.3.1.16 (410) along the edge to splash.edu (420) is [0.5, 0.5] 413. Passing through the matrix (404), the message (413) is multiplied by the matrix (404) to yield the message [0.971, 0.029] (414). For the incoming message of [0.971, 0.029] (414) to splash.edu (420), the message 414 is element-by-element multiplied by the prior [0.01, 0.99] (421b) yields approximately [0.25, 0.75]. This changes the TIC score of splash.edu from 1 to 25.

FIG. 4B shows an example graph illustrating scoring a set of objects. To deal with sets of objects, such as a CIDR, a set of child nodes (IPs 436a-d) are linked to the parent node (CIDR 430/433), which has a two state TIC score vector (431), e.g., "threatening" or "safe". However, if the set of objects are connected directly in the factor graph, the CIDR (433) will react multiplicatively to influences from the child nodes IPs (436a-d). In other words, a 10% change in the message sent by one child node (IPs 436a-d) will result in a 10% change in the TIC score of the CIDR. If each child node (IPs 436a-d) sent the same message, then the change will be by a factor of $1.1^N$ where N is the number of child nodes (IPs 436a-d) that are coupled to the CIDR 430. It would be better if a 10% change in each message resulted in only a 10% change in the CIDR 430, and that the change from only one child node (IPs 436a-d) would be by a factor of $$\frac{1.1}{N}.$$

An intermediary node (433) is therefore introduced to properly handle sets, e.g., as a "virtual node" connecting the CIDR 430 and the child nodes IPs 436a-d, with twice as many states as there are members in the set (e.g., 8 states). A linkage is then generated between the intermediary states and the set members (436a-d) along with a link with the parent node (430) of the set. Assuming that the member nodes are numbered from 0 to N−1, the matrix on the edge between each member node and the combining node is:

$$\begin{bmatrix} \delta & \delta & \delta & \delta & \ldots & 1 & 0 & \ldots & \delta & \delta & \delta & \delta \\ \delta & \delta & \delta & \delta & \ldots & 0 & 1 & \ldots & \delta & \delta & \delta & \delta \end{bmatrix}$$

The columns containing the identity matrix are 2i−1 and 2i where i is the index of the edge member. The value δ is an extremely small value (set in the settings file) that is close enough to 0 to be effectively 0, but still large enough that the message [δ, δ] still normalizes to [0.5, 0.5]. As show in FIG. 4B, the factor matrices between the CIDR intermediate node (433) and member nodes (436a-d) are 8×2 matrices (435a-d), and the CIDR intermediate node (433) will have an 8-state TIC score vector (434).

Therefore, the matrix between the intermediate node (433) and the parent node (430) will be a 2×8 matrix (432), e.g.,:

$$\begin{bmatrix} 1 & 0 \\ 0 & 1 \\ 1 & 0 \\ 0 & 1 \\ & \vdots \\ 1 & 0 \\ 0 & 1 \end{bmatrix}$$

Given these matrices, if threat indicators are applied to the child nodes (436a-d), then the "effective" indicator applied to the parent node (430) is the average of all the child node indicators. Likewise, any indicator applied to the parent node (430) is effectively applied to all the child nodes (436a-d).

In one implementation, to define a self-consistent set of graph messages, two rules are to be enforced on the factor graph, e.g., the sum rule and the product rule. The sum rule states that every message going out of a square is the matrix-multiplied version of the message coming into the square. It is called the 'sum' rule due to the fact that there is a weighted summation of each element in the incoming message to form each element of the outgoing message. The 'sum', therefore, is another name for the matrix multiplication that occurs when messages pass through the square. The product rule is the rule that each message exiting a circular node is the element-by-element multiplication of every other message coming into the node, except the message coming in from the same direction. Dividing each element by the sum of all elements in the message, after the multiplication process, normalizes the outgoing message of the node. This is called the 'product rule' due to the multiplication operation.

With these rules, a tree graph (one without any loops) can be made consistent with these rules. For example, a node can be selected as the root node, and then each leaf node of the tree generates a TIC score message when a threat indicator is applied to the respective leaf node, which is propagated to the root node. Once the root node has all the incoming messages, its outgoing messages can be generated, and these propagate back down to the leaves. All the changes to the TIC values can be calculated in time proportional to the number of edges in the graph, e.g., by adopting the Pearl algorithm.

In another implementation, when graphs have loops, the Pearl algorithm can be applied to loopy graphs, as well as graphs without loops, e.g., via the encoding algorithm 'Turbo Codes." By using large collections of applications for loopy belief propagation, the propagation of a message/indicator through the network graph to update TIC scores can be done accurately at a fast speed. For example, to perform message propagation in a loopy graph, the sum and product operations are performed as local operations on the graph at each square and circular node. These operations are completed locally whenever a message changes, until the messages all converge into a stable state.

This also can be used to allow graph alterations to be performed dynamically. If an indicator is added, or an edge is added to the network graph, then the messages on the graph change. The same convergence method can be employed to find our new state after the graph has been altered.

When the messages propagate in loops, there is an inherent causal structure in the messages. In other words, there are messages that will need to be propagated across an edge that are later versions of the original message that propagated across the edge. Therefore, a monitor process, e.g., the "scheduler," is adopted to enforce causality in the messages.

In one implementation, the scheduler processes messages as follows. Every time a new message is defined, the graph is not updated immediately. Instead, the difference between the new message and the last message to pass across the edge is calculated. This difference is called the 'residual' and is the absolute value of the difference in the components of the message. The residual represents how much the new message differs from the old message, or in other words, represents how much this section of the graph is going to change from its previous condition.

Once this residual is calculated, a marker representing the proposed graph change is placed in a heap structure that orders the graph changes. An example is shown in FIG. 4C. The heap holds all proposed graph changes 441-450, with the larger proposed changes stored above smaller ones. The largest proposed change (e.g., 441) is stored on the top.

Changes to the graph are processed one-by-one by being popped off of the top of the heap, taking the message with the largest residual each time. Once the message is processed, all messages that its associated change affects are identified, the new changes that result are placed on the heap. If the residual is under a certain predefined threshold (i.e. too small), then no message is placed, since the change to the graph is too small to care about. Once no more changes remain, processing stops. Such changes can be processed in complete graphs. A complete graph is a graph where every pair of nodes has an edge between them. This means that for N nodes, there will be a number of N-choose-2 edges, a number of N-choose-3 triangles, a number of N-choose-4 4-node loops, etc. For a 100-node example, that's 4,950 edges, 161,700 triangles, 3,921,225

4-loops, 75,287,520 5-loops, etc. In one implementation, the CTMC may keep a log file to monitor changes on the graph.

Figure 5A:
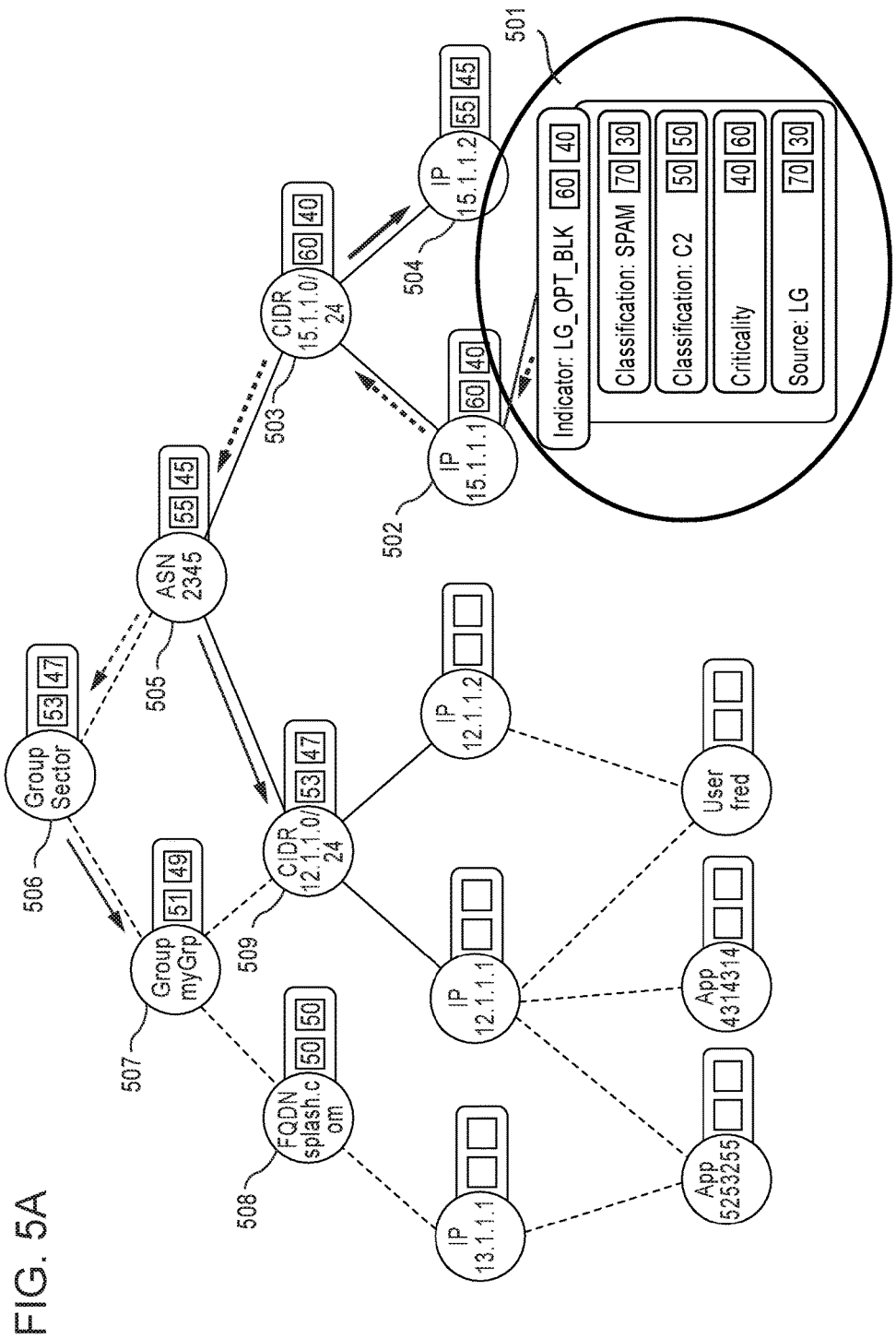
FIG. 5A provides an example graph illustrating the influence of a threat indicator on the threat indicator confidence scores of network elements in a network graph and such influence decays over time as it propagate across the network graph, according to an embodiment.

FIGS. 5A-5F provide additional numeric examples illustrating functions performed by the TIC calculation module 202 and TIC propagation module 203 in FIG. 2A. FIG. 5A provides an example graph illustrating the influence of a threat indicator on the threat indicator confidence scores of network elements in a network graph, according to an embodiment. For example, a single indicator 501 may be associated with an IP host 502 (also referred to as a "node"), and the TIC score can be determined for the IP address of IP host 502. As shown in FIG. 5A, the influence of the threat indicator 501 can pass through the network graph, e.g., from node 502 to 503, from 503 to 504, from 503 to 505, from 505 to 506 and 509, from 506 to 507, from 507 to 508, and so on. The propagation and/or the influence of the threat indicator 501 reduce as messages propagate away from source node 502.

Figure 5B:
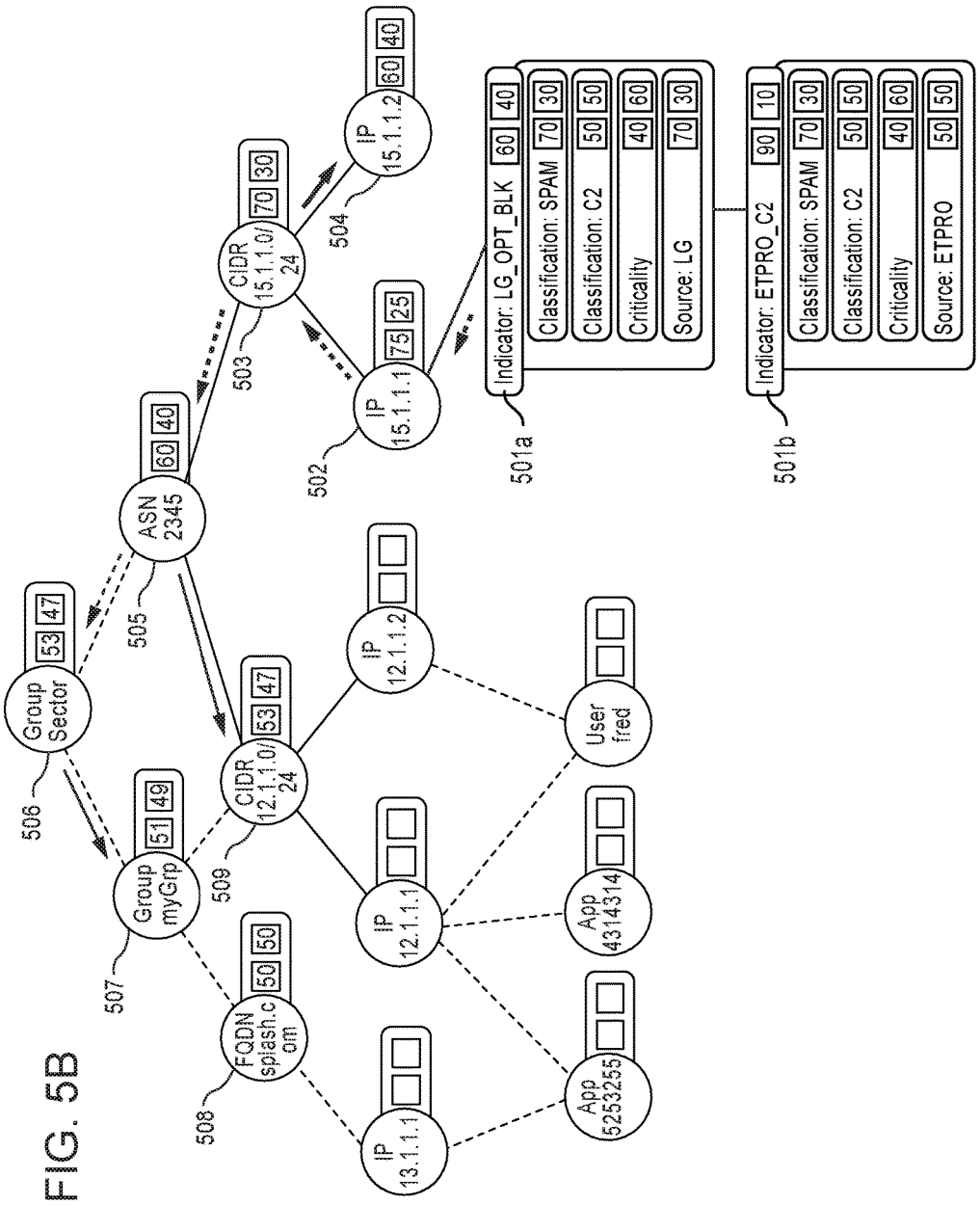
FIG. 5B provides an example graph illustrating the influence of more than one threat indicator on the threat indicator confidence scores of network elements in a network graph, according to an embodiment.

FIG. 5B provides an example graph illustrating the influence of more than one threat indicator (e.g., 501a-b) on the threat indicator confidence scores of network elements in a network graph, according to an embodiment. When multiple threat indicators 501a-b are associated with the same IP host 502, the IP host's TIC score is calculated based on aggregated values across set of indicators 501a-b.

Figure 5C:
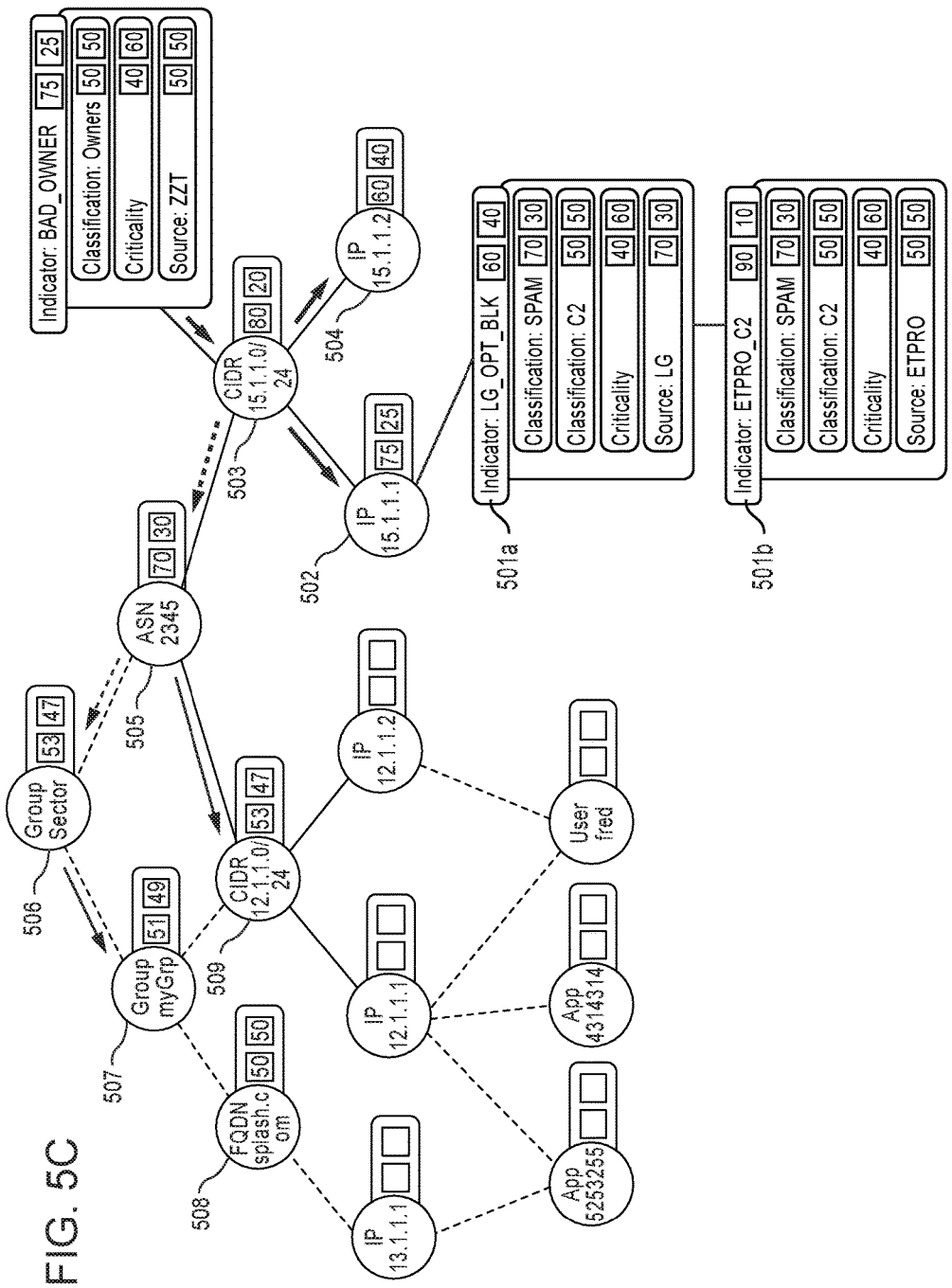
FIG. 5C provides an example graph illustrating the downward propagation of influence of a threat indicator in a network graph, according to an embodiment.

FIG. 5C provides an example graph illustrating the downward propagation of influence of a threat indicator in a network graph, according to an embodiment. When a threat indicator is associated with CIDR 503, messages propagate across the network graph in downward and upward directions. For example, the message propagates downwardly from parent node (e.g., 503) to child node (e.g., 502, 504, etc.), or container to member. The message also propagates upwardly from child node to parent node or from member to container, e.g., from 503 to 505, from 505 to 506, etc.

Figure 5D:
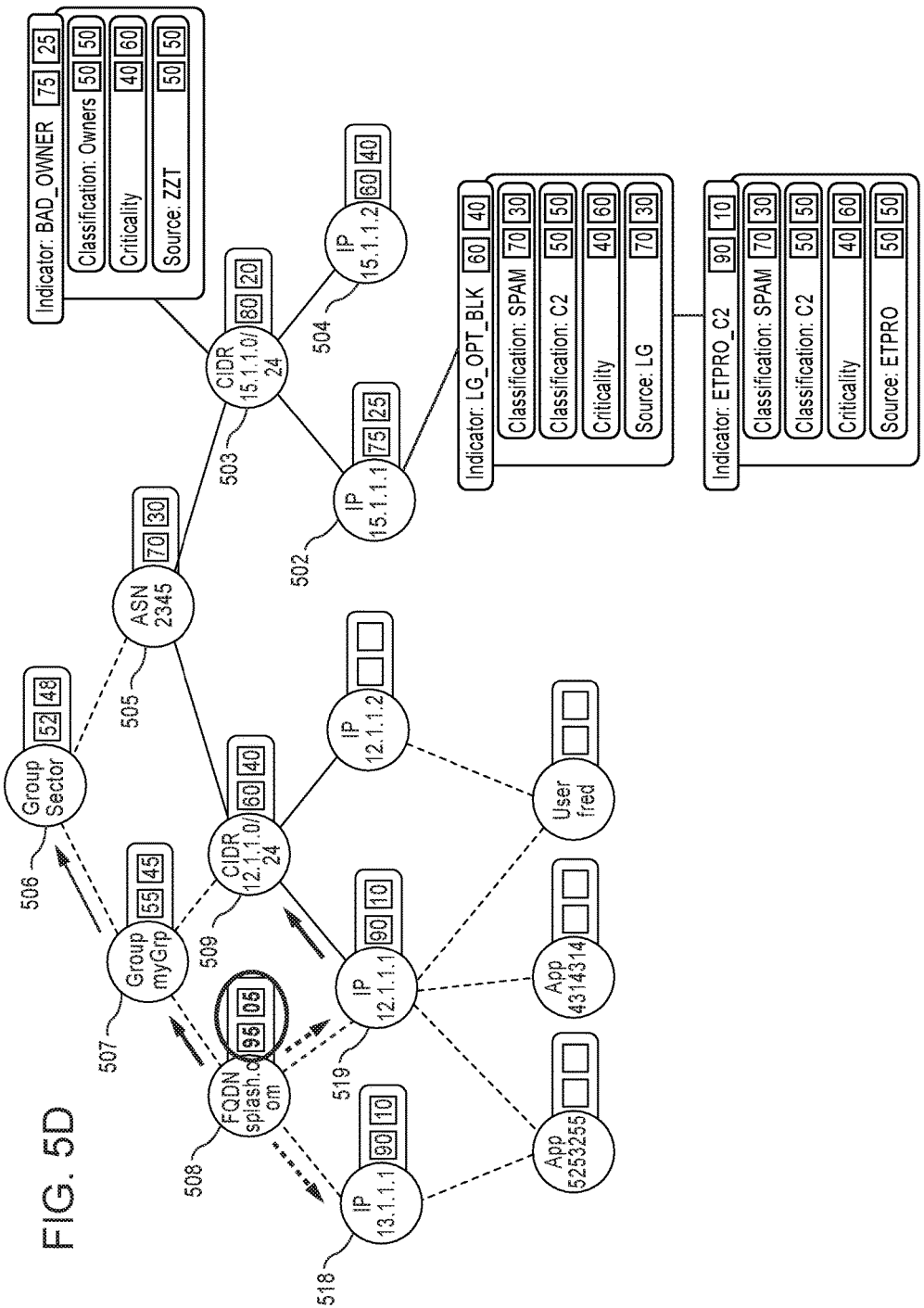
FIG. 5D provides an example graph illustrating the influence of manual input that changes a characteristic of a threat indicator on the threat indicator confidence scores of network elements in a network graph, according to an embodiment.

FIG. 5D provides an example graph illustrating the influence of manual input that changes a characteristic of a threat indicator on the threat indicator confidence scores of network elements in a network graph, according to an embodiment. For example, a threat analyst specifies TIC score on specific domain, e.g., at the FQDN 508 to manually enter a TIC score vector as [0.95, 0.05] (shown as "95" and "05"). Messages propagate across the network graph, updating relevant entities, e.g., from 508-507, from 508 to 518-519, etc.

Figure 5E:
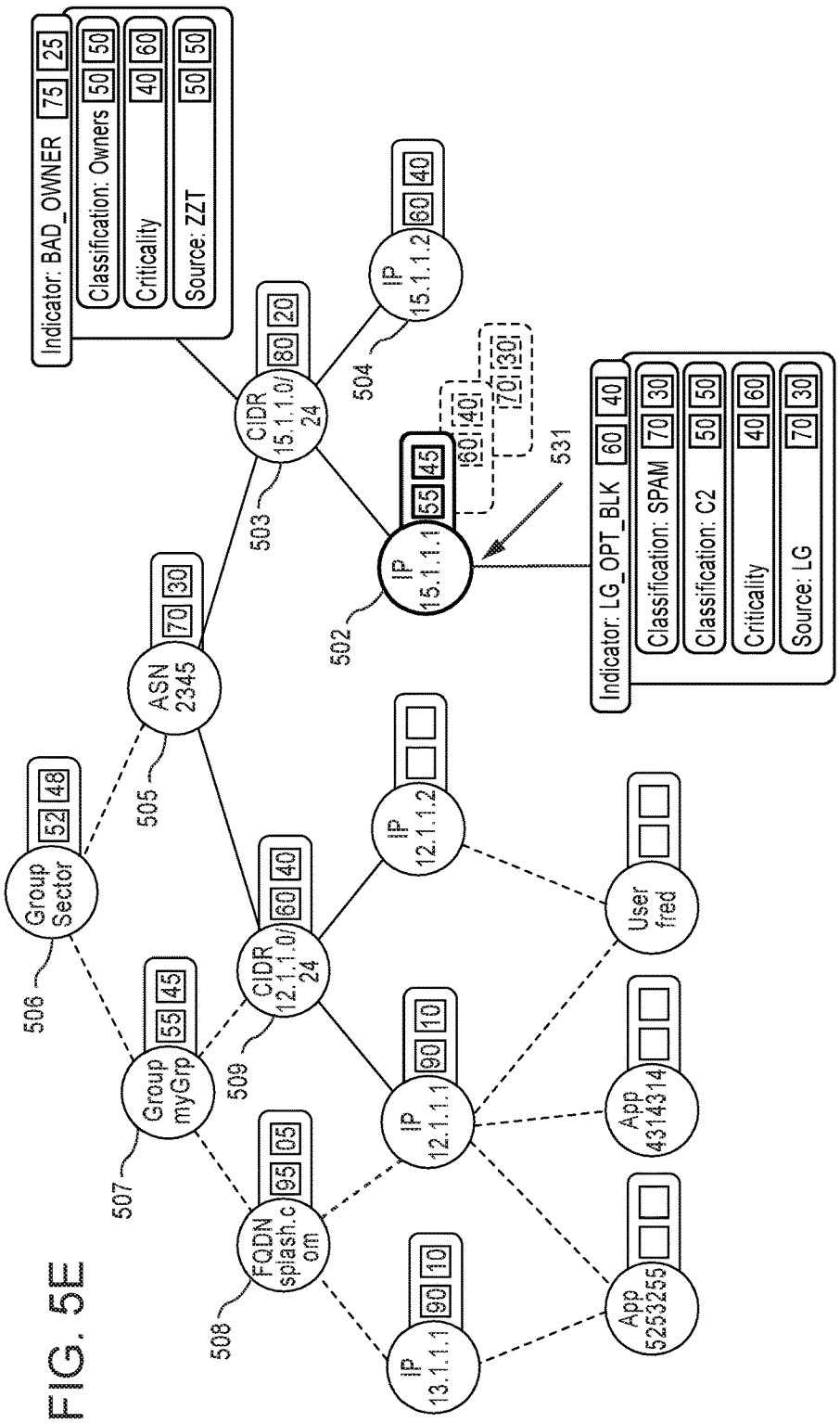
FIG. 5E provides an example graph illustrating time decay of the influence of a threat indicator on the threat indicator confidence scores of network elements in a network graph, according to an embodiment.

FIG. 5E provides an example graph illustrating time decay of the influence of a threat indicator on the threat indicator confidence scores of network elements in a network graph, according to an embodiment. For example, time lapse can cause a TIC score(s) to degrade, e.g., see 531. Newer threat indicators may have more influence than older threat indicators at the IP host 502.

Figure 5F:
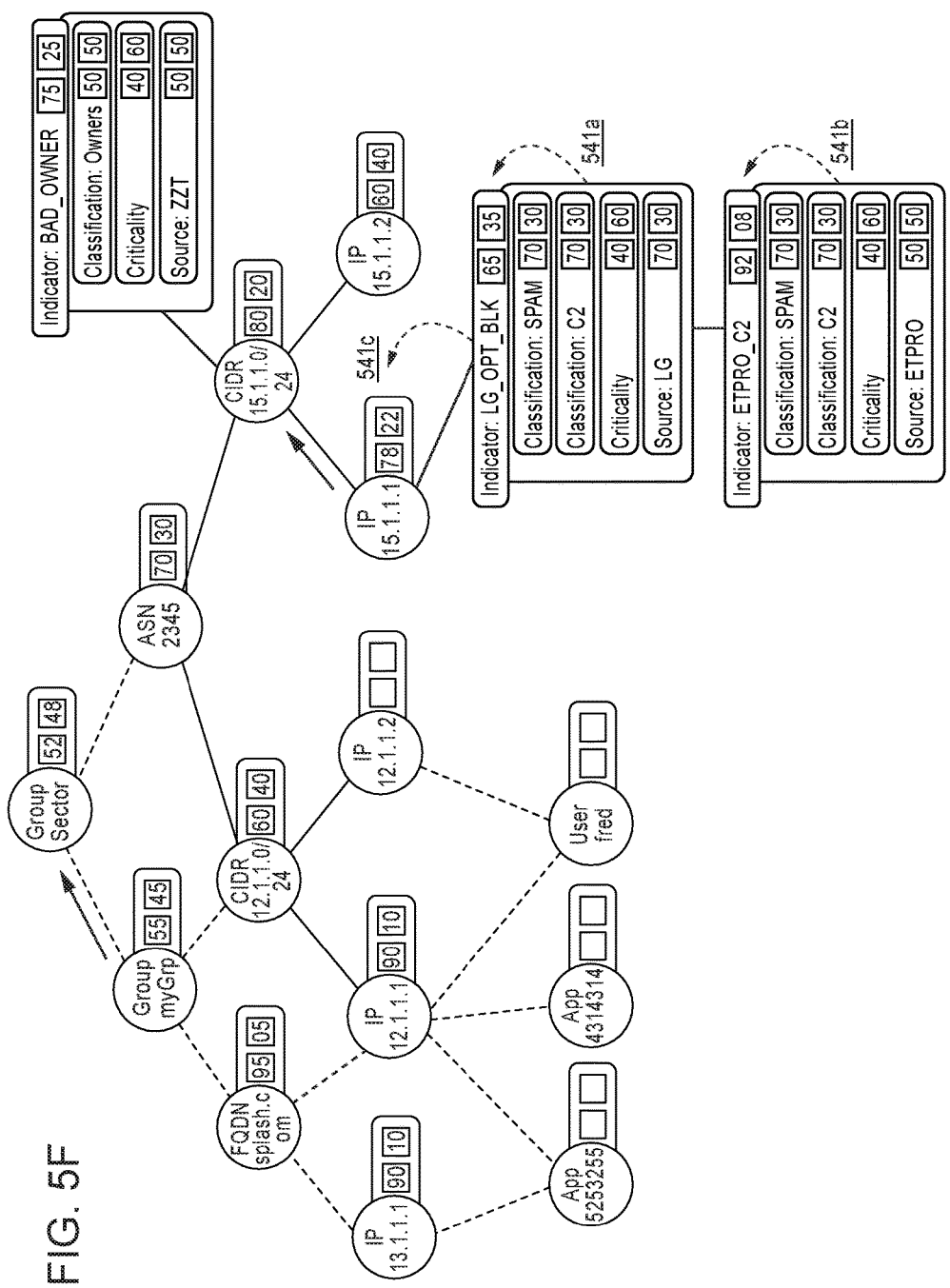
FIG. 5F provides an example graph illustrating the influence of group changes (e.g., changes in classification) from a threat indicator in a network graph, according to an embodiment.

FIG. 5F provides an example graph illustrating the influence of group changes from a threat indicator in a network graph, according to an embodiment. In one implementation, a change to classification scores affects all threat indicators of the same classification, e.g., when the classification "C2" has been changed, both TIC scores threat indicators of the same classification may be updated based on the changed classification, e.g., see 541a and 541b. Changes to indicator scores can propagate to elements associated, e.g., 541c.

In a further implementation, the CTMC may adopt parallelized methods of handling messages, e.g., at the TIC score calculation module 103 in FIG. 1A; these parallelized methods tend to fall into two categories: synchronous and asynchronous. Synchronous methods perform a message pass across all edges once for every iteration loop. The CTMC system loops until convergence is reached. While simple to implement in parallel, if the CTMC system does not converge rapidly, many unnecessary message-passing operations are performed.

Asynchronous methods, such as the Splash Algorithm, use a single monitor process to coordinate a large number of other processes that are tasked with processing the messages. The monitor process maintains the scheduling heap. Effective parallelization of 100 processors has been reported using this technique.

In the asynchronous case, blocking is used for operations affecting the heap in the monitor process (heap addition, replacement, removal, etc.) and for any operation affecting a single node (calculating the effects of a new message applied to a node, specifically the determination of messages exiting that node.) However, monitor operations are fast and node operations are strongly local. Therefore, a high level of parallelism can likely be achieved before splitting the network graph into different regions with different monitors. The efficiency that is gained by processing only messages that have significant residuals, therefore causes asynchronous approaches typically to be far faster than synchronous methods.

In another example, the network graph can be split into regions, where a separate bank of core processors processes the messages in each region asynchronously. Once all the regions have converged, messages are synchronously passed across the region boundaries, and the asynchronous processing is restarted.

If the network graph is split, the network graph can be partitioned into different shards (e.g., a sub-graph within the network graph) so that minimal communication across boundaries between the shards is necessary. Each shard of the network graph acquires or uses its own monitor process. Messages that are to be passed between shards are attached to special edges that contain appropriate routines used for shard passing. It is possible, though not likely, bad looping conditions may occur if messages that are passed between shards are propagated immediately. The lack of a common monitor between shards may lead to a message being passed back to the original shard before messages on the new shard are fully converged. To prevent this effect, it is desirable to allow all shards to come to convergence before passing influences between shards. This approach, therefore, combines the synchronous algorithm in the global network graph with the asynchronous algorithm in each shard to guarantee convergence.

FIGS. 6A-6D provide exemplary user interface (UI) diagrams illustrating aspects of presenting and visualizing threat indicator confidence scores, according to an embodiment. The UI diagrams in FIGS. 6A-6D can be an example output 223 in FIG. 2A. In one implementation, the TIC scores may be presented via a graphical user interface, e.g., a user data dashboard as shown at 601-603 in FIG. 6A, or FIG. 6B. The TIC scores can be organized by user-defined collections as well as system network collections, e.g., by sector ("Energy", "Financial") 601, by corporate entity indicators (e.g., "Fedex", "USPO," etc.) 602, by ASN, by CIDR, by IP (e.g., see 603) and/or the like. The TIC scoring can be shown as both pseudo-real-time or historical over-system-history period (e.g., 30, 60, 90 days).

As shown in FIG. 6B, the UI can provide real-time and historical views, alerts to users based on thresholds, threat confidence across different network elements (AS, CIDR, Domain, IP, Entities/User-defined (Project Indicators)) including scores for individual network elements, and/or scoring comparison over time by network element. In one implementation, the user can observe threat indicators contributing to a network element's overall TIC score, and make customization per source, classification and/or indicator of the threat indicator.

For example, for the TIC score report for the CIDR 604, TIC score 605 can be determined by direct assigned and inherited assignment of threat confidence. A user can view current (e.g., 605) or historical data (e.g., 608), view contributing factors (e.g., 606), view indicators attached to the CIDR (e.g., see 609), and/or read contributing details for chosen timeframe, and/or the like. In another example, the TIC score performance can be shown based on user-defined sector or network topology association.

Figure 6A:
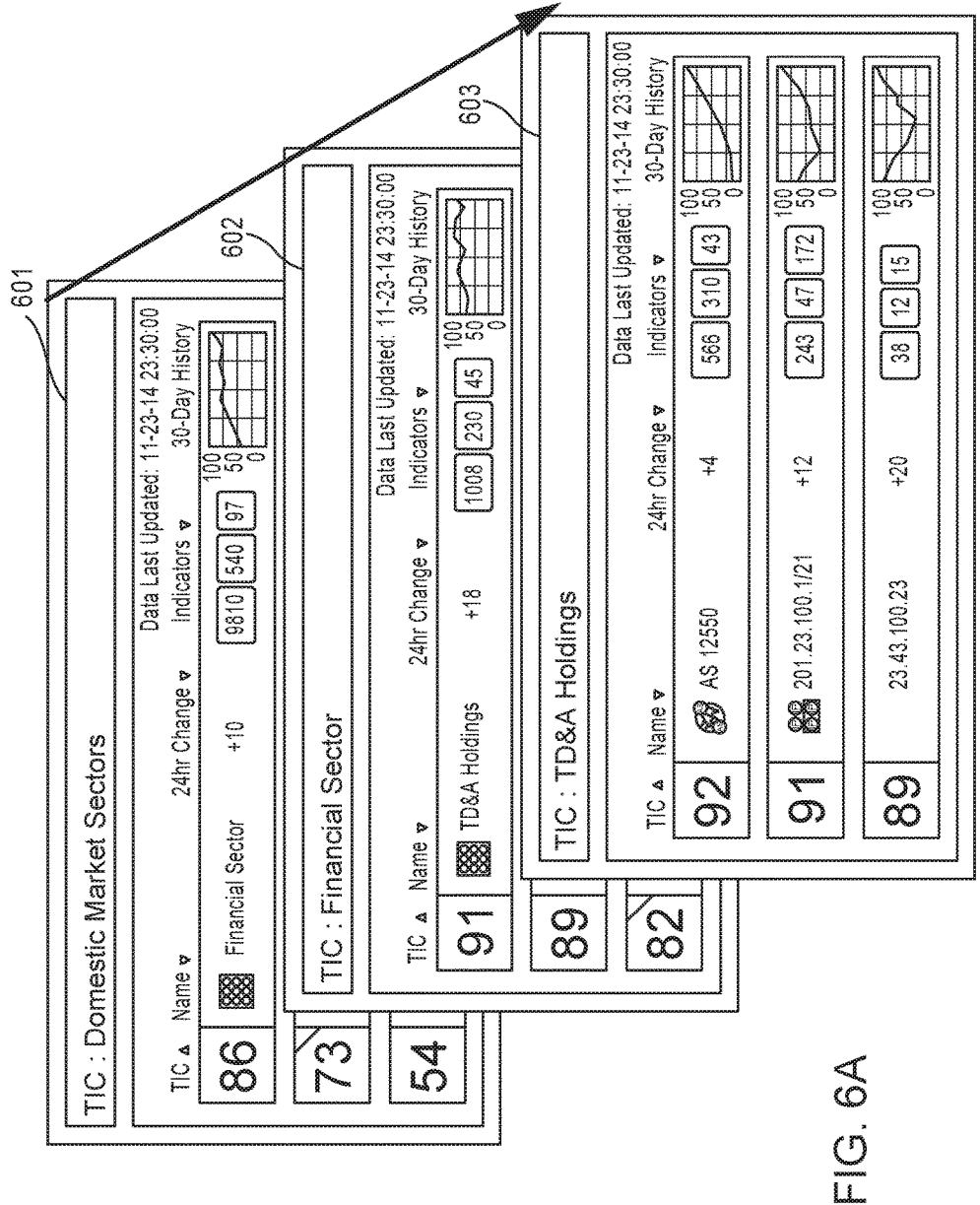
Figure 6B:
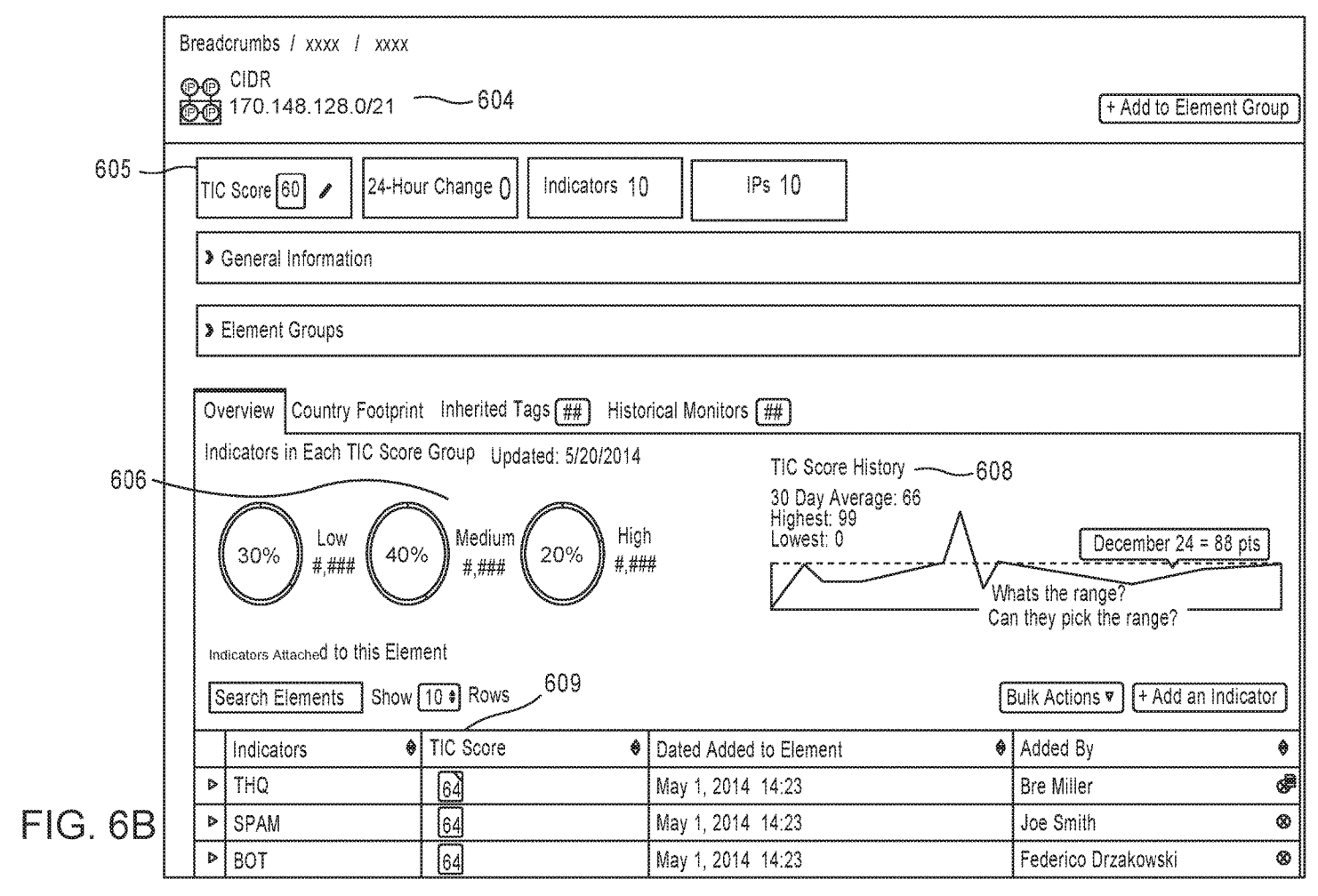
Figure 6C:
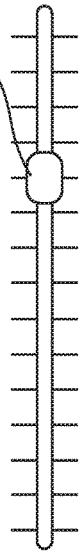
Figure 6D:
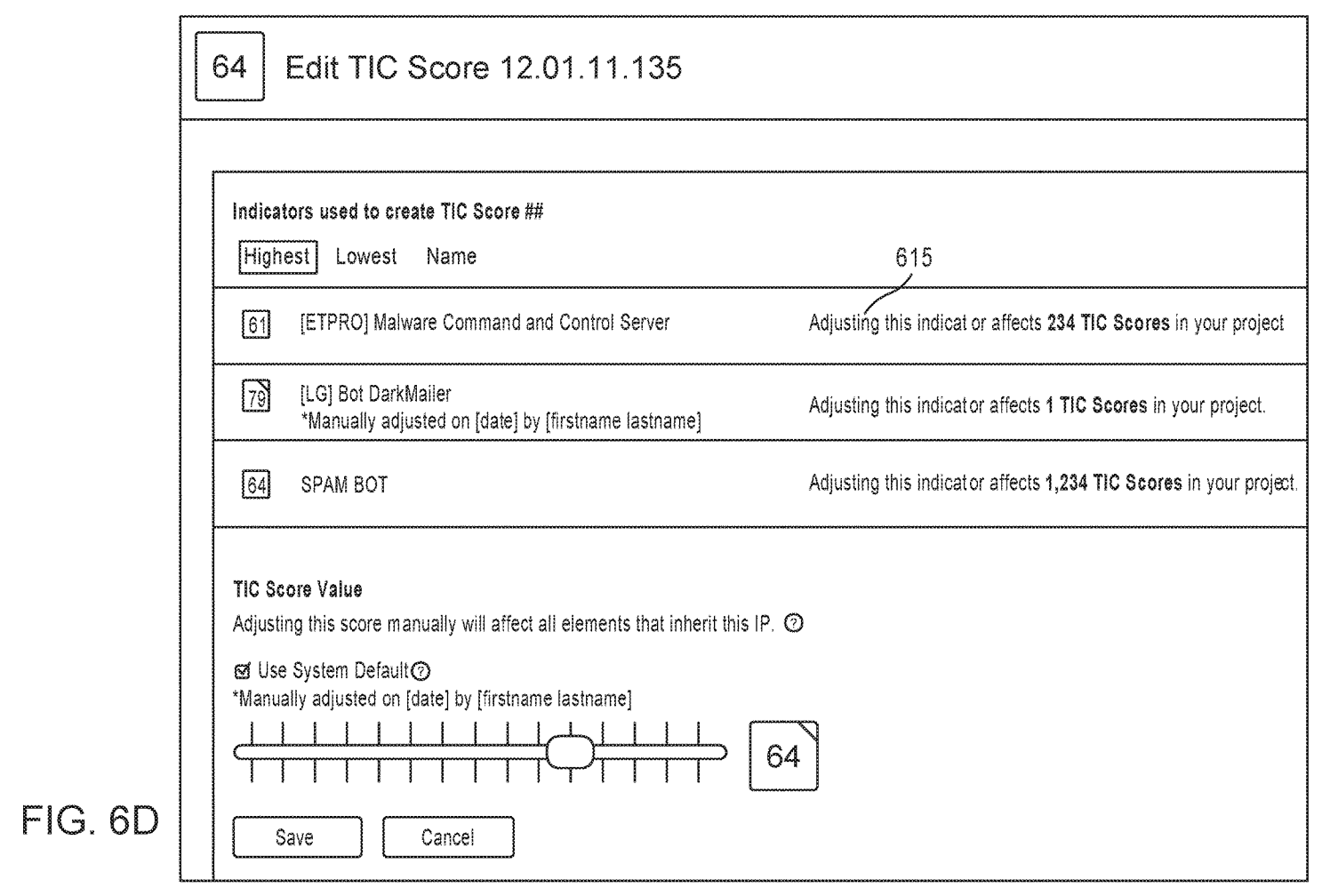

As shown in FIG. 6C, analysts can change the TIC score (e.g., by the sliding widget 611), contributing factors associated with source, classification and individual indicators, and view how the change will affect other scores in the graph (e.g., 612), e.g., as shown at 615 in FIG. 6D.

It is intended that the systems and methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including Clojure, C, C++, Java™, Ruby, Python, JavaScript, Perl, PHP, Visual Basic™, and other object-oriented, procedural, functional, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A processor-implemented method, comprising:
sending a signal to cause a user interface to render a representation of a probabilistic network security measure of each network element from a set of network elements within a network security assessment graph;
receiving an indication via the user interface of a change related to the network security assessment graph;
determining a group of influenced network elements from the set of network elements in response to the change related to the network security assessment graph based on a factor matrix that represents a joint threat and safety probabilities for the set of network elements, the factor matrix including a factor indicative of a correlation between a pair of network elements from the set of network elements;
dynamically updating the factor matrix for the group of influenced network elements to produce an updated factor matrix;
dynamically updating the probabilistic network security measure for each network element from the set of network elements to produce an updated probabilistic network security measure for each network from the set of network elements based at least in part on the updated factor matrix and the change related to the network security assessment graph; and
sending a signal to cause the user interface to render a representation of the updated probabilistic network security measure for each network element from the set of network elements within the network security assessment graph.

2. The processor-implemented method of claim 1, wherein the change related to the network security assessment graph is made via manual input from a user via the user interface.

3. The processor-implemented method of claim 1, wherein the change related to the network security assessment graph includes influence degradation over time from the threat indicator.

4. The processor-implemented method of claim 1, wherein the factor matrix or the network security assessment graph is dynamically updated in network elements from the set of network elements that are affected by the change related to the network security assessment graph.

5. The processor-implemented method of claim 1, wherein the change related to the network security assessment graph includes a structural change of the network security assessment graph.

6. The processor-implemented method of claim 1, wherein:
the change related to the network security assessment graph includes a transient change to the network security assessment graph or the factor matrix, and
an influence of the change related to the network security assessment graph degrades impact over time.

7. The processor-implemented method of claim 1, wherein:
the change related to the network security assessment graph includes a user defined condition, and
the probabilistic network security measure of each network element from the set of network elements and in the network security assessment graph is dynamically updated based on the user defined condition.

8. The processor-implemented method of claim 1, wherein the change related to the network security assessment graph includes a changed value of a characteristic associated with the threat indicator.

9. The processor-implemented method of claim 1, wherein the set of network elements includes a number of network elements no less than one million.

10. The processor-implemented method of claim 1, wherein each network element from a set of network elements includes any of an Internet protocol (IP) host, a classless inter-domain router (CIDR), a fully qualified domain name (FQDN), an autonomous system number (ASN), an application or application identifiers, a group sector, or a user.

11. An apparatus, comprising:
a processor; and
a memory operatively coupled to the processor, the memory storing processor-readable instructions executable by the processor to:
send a signal to cause a user interface to render a representation of a probabilistic network security measure of each network element from a set of network elements within a network security assessment graph;
receive an indication via the user interface of a change related to the network security assessment graph;
determine a group of influenced network elements from the set of network elements in response to the change related to the network security assessment graph based on a factor matrix that represents a joint threat and safety probabilities for the set of network elements, the factor matrix including a factor indicative of a correlation between a pair of network elements from the set of network elements;
dynamically update the factor matrix for the group of influenced network elements to produce an updated factor matrix;
dynamically update the probabilistic network security measure for each network element from the set of network elements to produce an updated probabilistic network security measure for each network from the set of network elements based at least in part on the updated factor matrix and the change related to the network security assessment graph; and
send a signal to cause the user interface to render a representation of the updated probabilistic network security measure for each network element from the set of network elements within the network security assessment graph.

12. The apparatus of claim 11, wherein the change related to the network security assessment graph is made via manual input from a user via the user interface.

13. The apparatus of claim 11, wherein the change related to the network security assessment graph includes influence degradation over time from the threat indicator.

14. The apparatus of claim 11, wherein the factor matrix or the network security assessment graph is dynamically updated in network elements from the set of network elements that are affected by the change related to the network security assessment graph.

15. The apparatus of claim 11, wherein the change related to the network security assessment graph includes a structural change of the network security assessment graph.

16. The apparatus of claim 11, wherein:
the change related to the network security assessment graph includes a transient change to the network security assessment graph or the factor matrix, and an influence of the change related to the network security assessment graph degrades impact over time.

17. The apparatus of claim 11, wherein:
the change related to the network security assessment graph includes a user defined condition, and the probabilistic network security measure of each network element from the set of network elements and in the network security assessment graph is dynamically updated based on the user defined condition.

18. The apparatus of claim 11, wherein the change related to the network security assessment graph includes a changed value of a characteristic associated with the threat indicator.

19. The apparatus of claim 11, wherein the set of network elements includes a number of network elements no less than one million.

20. The apparatus of claim 11, wherein each network element from a set of network elements includes any of an Internet protocol (IP) host, a classless inter-domain router (CDR), a fully qualified domain name (FQDN), an autonomous system number (ASN), an application or application identifiers, a group sector, or a user.

* * * * *